US010823118B1

(12) United States Patent
Dudar

(10) Patent No.: US 10,823,118 B1
(45) Date of Patent: Nov. 3, 2020

(54) SYSTEMS AND METHODS FOR PREVENTING ENGINE STALL

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 5 days.

(21) Appl. No.: 16/403,289

(22) Filed: May 3, 2019

(51) Int. Cl.

| | |
|---|---|
| ***F02M 25/08*** | (2006.01) |
| ***B60W 30/188*** | (2012.01) |
| ***F04D 27/00*** | (2006.01) |
| ***F02D 41/00*** | (2006.01) |

(52) U.S. Cl.
CPC .... *F02M 25/0827* (2013.01); *B60W 30/1884* (2013.01); *F02D 41/0035* (2013.01); *F04D 27/001* (2013.01)

(58) Field of Classification Search
CPC .............. F02M 25/0827; F04D 27/001; F02D 41/0035; B60W 30/1884
See application file for complete search history.

(56) References Cited

U.S. PATENT DOCUMENTS

| | | | | |
|---|---|---|---|---|
| 7,503,320 | B2 | 3/2009 | Collet | |
| 9,255,553 | B2 | 2/2016 | Dudar et al. | |
| 9,416,755 | B2 | 8/2016 | Dudar | |
| 2015/0025781 | A1 * | 1/2015 | Pearce .................... | F02D 41/22 701/114 |

OTHER PUBLICATIONS

Bomey, N., "Ford recalls 1.5 million Ford Focus cars that could stall with fuel tank problem," USA Today Website, Available Online at https://www.usatoday.com/story/money/cars/2018/10/25/ford-focus-recall-1-5-m-cars-fixed-avoid-potential-stalling/1759870002/, Oct. 25, 2018, 1 page.
Dudar, A., "An Evaporative Emission Control System and Diagnostic Method," U.S. Appl. No. 16/000,758, filed Jun. 5, 2018, 48 pages.

* cited by examiner

*Primary Examiner* — Xiao En Mo
(74) *Attorney, Agent, or Firm* — Geoffrey Brumbaugh; McCoy Russell LLP

(57) ABSTRACT

Methods and systems are provided for reducing or avoiding engine hesitation and/or stall during engine idle conditions. In one example, a method may include inferring an engine idle condition, and in response, controlling a speed of an engine to a compensated engine idle speed that is a function of an extent to which a canister purge valve that regulates an amount of fluid flow to the engine from a fuel system and/or an evaporative emissions system, is degraded. In this way, an amount of fuel utilized to compensate for the degraded canister purge valve may be proportionate to the extent to which the canister purge valve is degraded.

20 Claims, 8 Drawing Sheets

| Extent of CPV degradation | Manifold vacuum: -8 InHg | -10 InHg | -12 InHg | -14 InHg | -16 InHg | -18 InHg | -20 InHg |
|---|---|---|---|---|---|---|---|
| 0.0" | 30 | 50 | 70 | 90 | 110 | 130 | 150 |
| 0.02" | 50 | 70 | 90 | 110 | 130 | 150 | 170 |
| 0.04" | 70 | 90 | 110 | 130 | 150 | 170 | 190 |
| 0.06" | 90 | 110 | 130 | 150 | 170 | 190 | 210 |
| 0.08" | 110 | 130 | 150 | 170 | 190 | 210 | 230 |
| 0.10" | 130 | 150 | 170 | 190 | 210 | 230 | 250 |

SYSTEMS AND METHODS FOR PREVENTING ENGINE STALL

FIELD

The present description relates generally to methods and systems for adjusting an engine idle speed as a function of an extent of degradation of a valve that regulates a fluid flow to the engine.

BACKGROUND/SUMMARY

Vehicle evaporative emission control systems may be configured to store fuel vapors from fuel tank refueling and diurnal engine operations in a fuel vapor canister, and then purge the stored vapors during a subsequent engine operation. The stored vapors may be routed to engine intake for combustion, further improving fuel economy.

In a typical fuel vapor canister purge operation, a canister purge valve (CPV) coupled between the engine intake and the fuel canister is duty cycled, allowing for intake manifold vacuum to be applied to the fuel canister. Simultaneously, a canister vent valve (CVV) coupled between the fuel canister and atmosphere is opened, allowing for fresh air to enter the canister. This configuration facilitates desorption of stored fuel vapors from the adsorbent material in the fuel vapor canister, regenerating the adsorbent material for further fuel vapor adsorption.

However, over time the act of duty cycling the CPV can result in contaminants being introduced to the CPV or other forms of degradation, which may result in the CPV not effectively sealing. U.S. Pat. No. 9,255,553 discloses methodology for detecting canister purge valve degradation that includes indicating degradation in response to a canister temperature change (and in some examples additionally based on a fuel system pressure change) while an engine is in operation and under conditions where the canister purge valve is closed. In response to such an indication of canister purge valve degradation, U.S. Pat. No. 9,255,553 discloses taking mitigating action in the form of setting a diagnostic code in an onboard diagnostics system and/or sending a message to a message center in the vehicle to alert a vehicle operator of the degraded canister purge valve condition. However, the inventors have recognized potential issues with such an approach. Specifically, the disclosure of setting a diagnostic code/alerting the operator does not take into account undesired issues related to engine operation which may occur while the canister purge valve is degraded but before the degradation issue has been remedied. For example, a degraded canister purge valve may lead to unmetered fuel vapors being inducted into the engine, which may result in engine hesitation and/or stall. Such a situation may be exacerbated as a function of the extent of canister purge valve degradation.

Accordingly, the inventors herein have recognized such issues and have herein developed systems and methods to at least partially address them. In one example, a method comprises inferring an engine idle condition, and in response, controlling a speed of an engine to a compensated engine idle speed that is a function of an extent to which a canister purge valve that regulates an amount of fluid flow to the engine from a fuel system and/or an evaporative emissions system, is degraded. In this way, the compensated engine idle speed may be proportionate to the degree or extent to which the canister purge valve is degraded, which may improve fuel economy as compared to simply raising engine idle speed to a predetermined amount without accounting for the degree to which the canister purge valve is degraded. By compensating for the degraded canister purge valve in such fashion, issues related to engine hesitation and/or stall may be reduced or avoided.

In one example, the extent to which the canister purge valve is degraded may be determined based on a rate at which an engine vacuum reduces a pressure in the fuel system and the evaporative emissions system under conditions where the fuel system and the evaporative emissions system are sealed from atmosphere and where the canister purge valve is commanded closed. Thus, by periodically conducting such a diagnostic, the extent to which the canister purge valve is degraded may be regularly determined, and engine idle speed compensated accordingly.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 depicts an example lookup table for controlling an engine idle speed.

DETAILED DESCRIPTION

Figure 1:
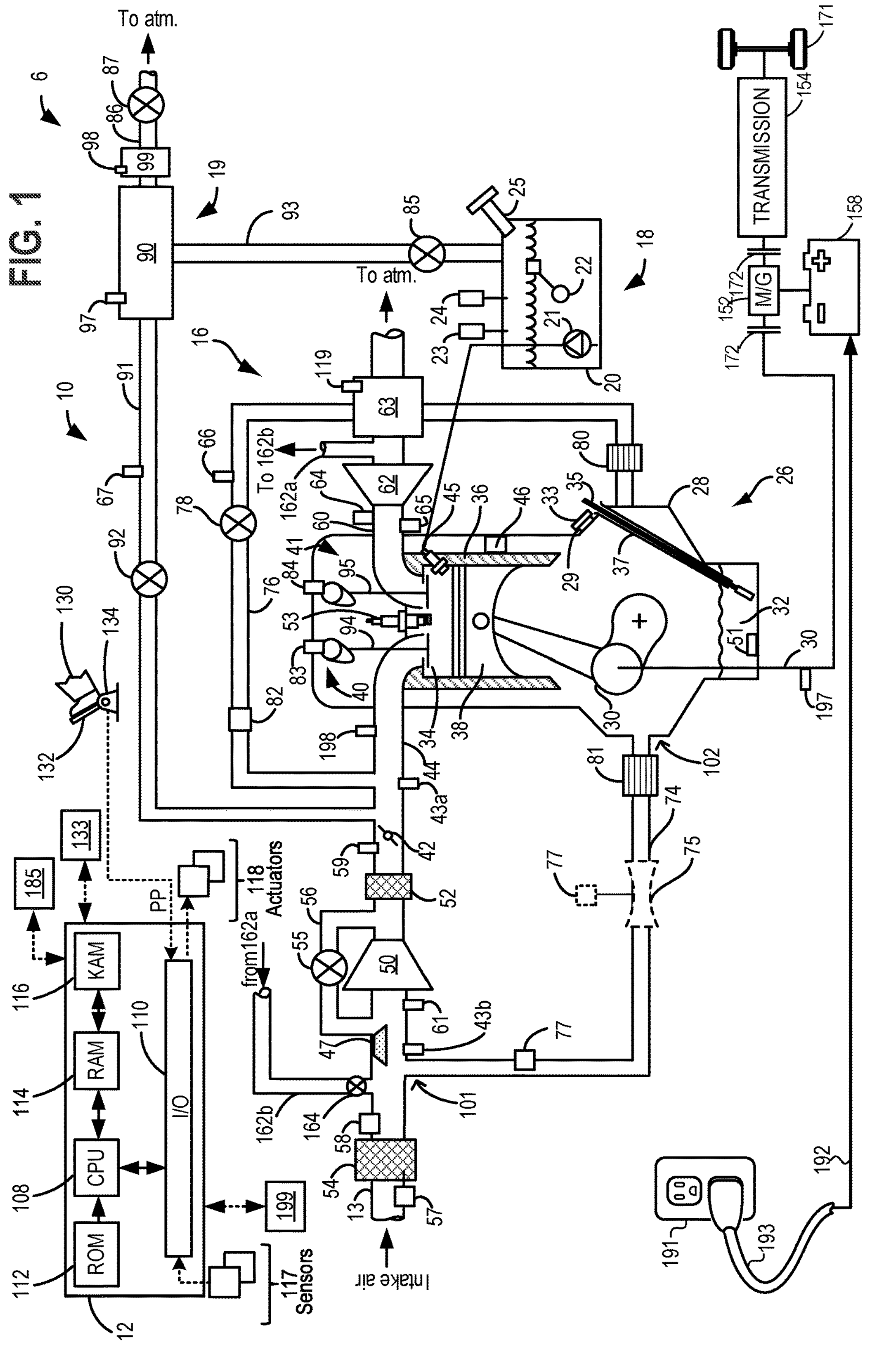
FIG. 1 shows a schematic description of an engine coupled to a fuel system, and an evaporative emissions system.
Figure 2:
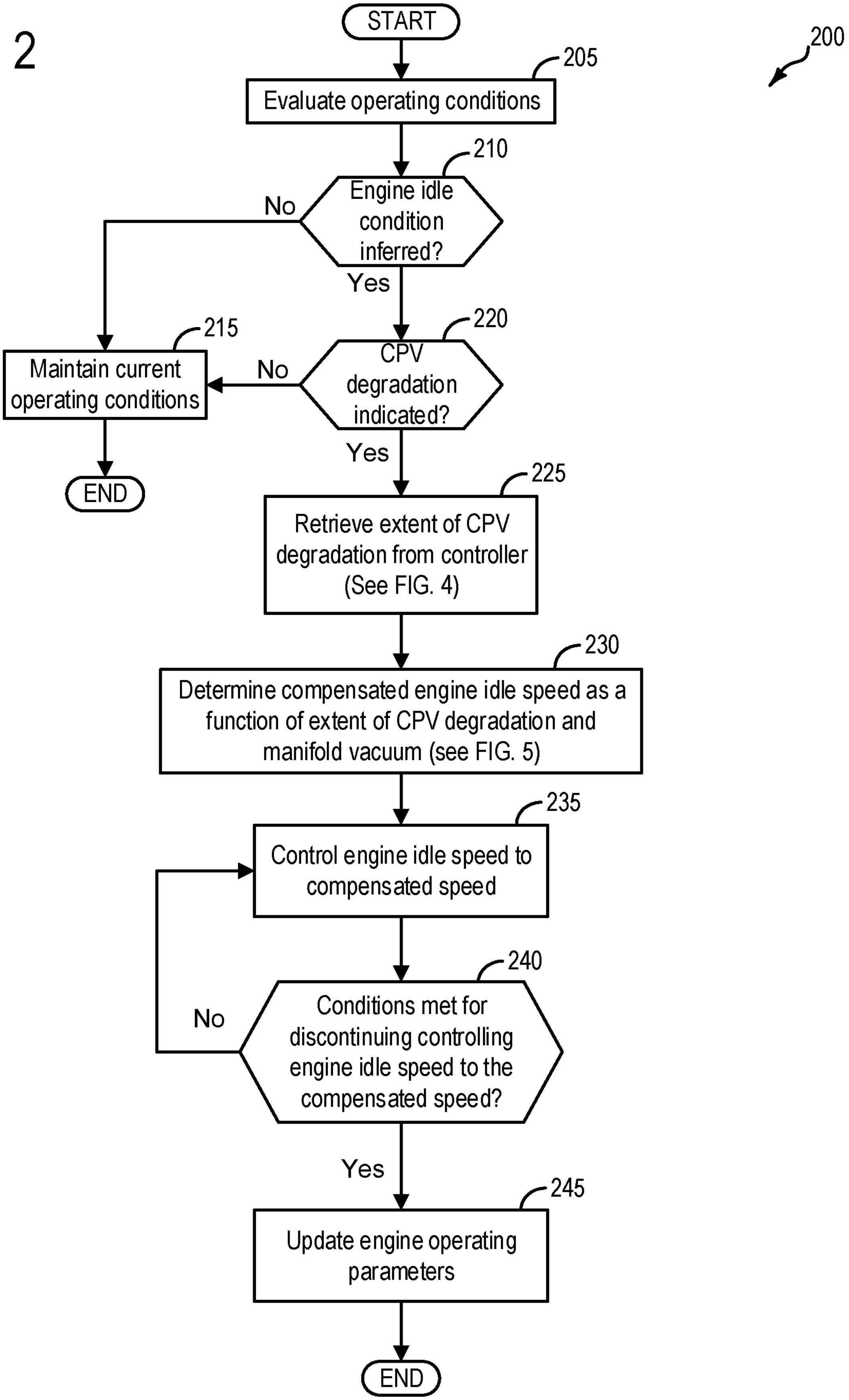
FIG. 2 depicts a flowchart for an example method for controlling engine idle speed based on an extent of canister purge valve degradation.
Figure 3:
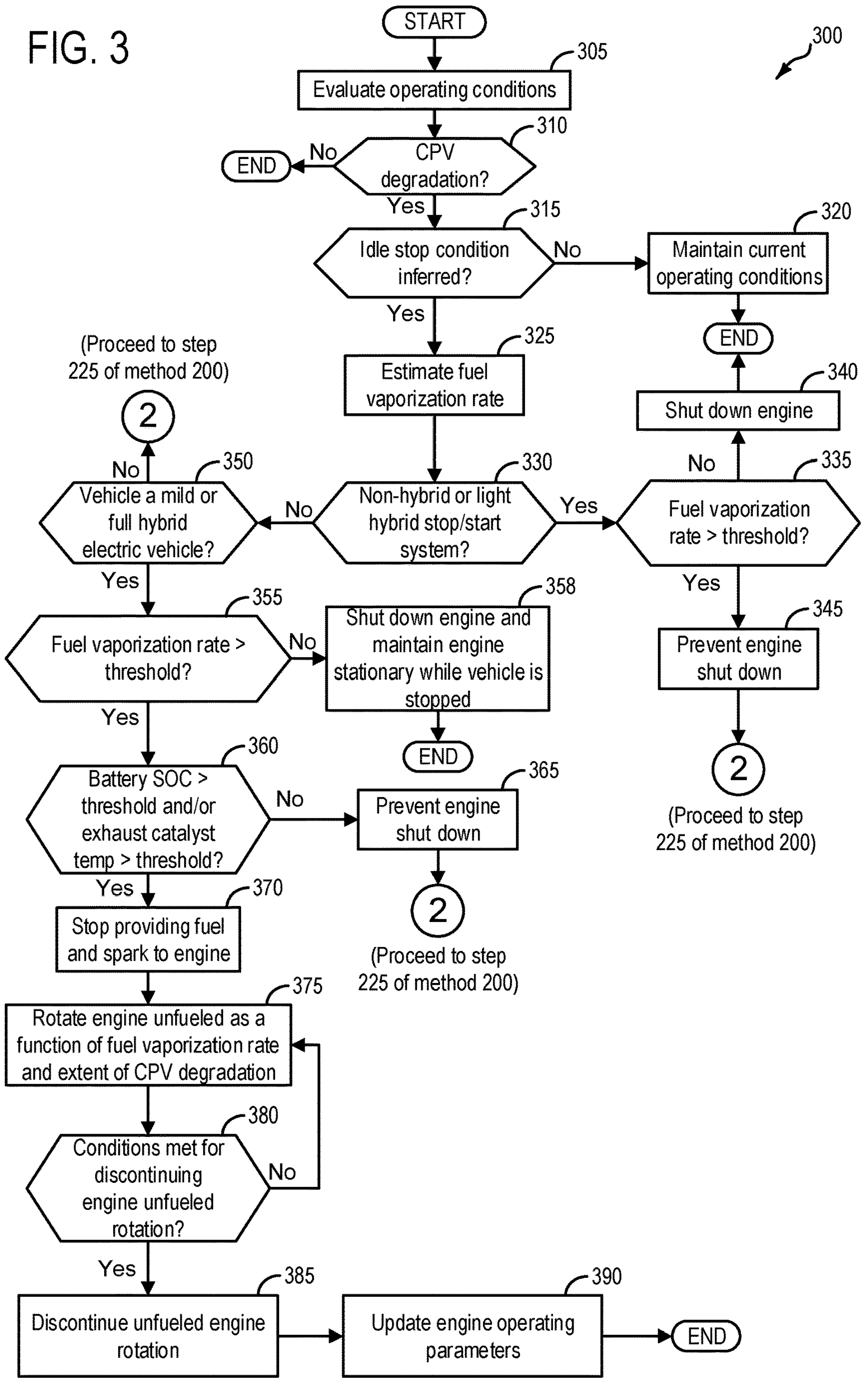
FIG. 3 depicts a flowchart for an example method for controlling an engine at an idle stop event depending on type of engine and/or vehicle.
Figure 4:
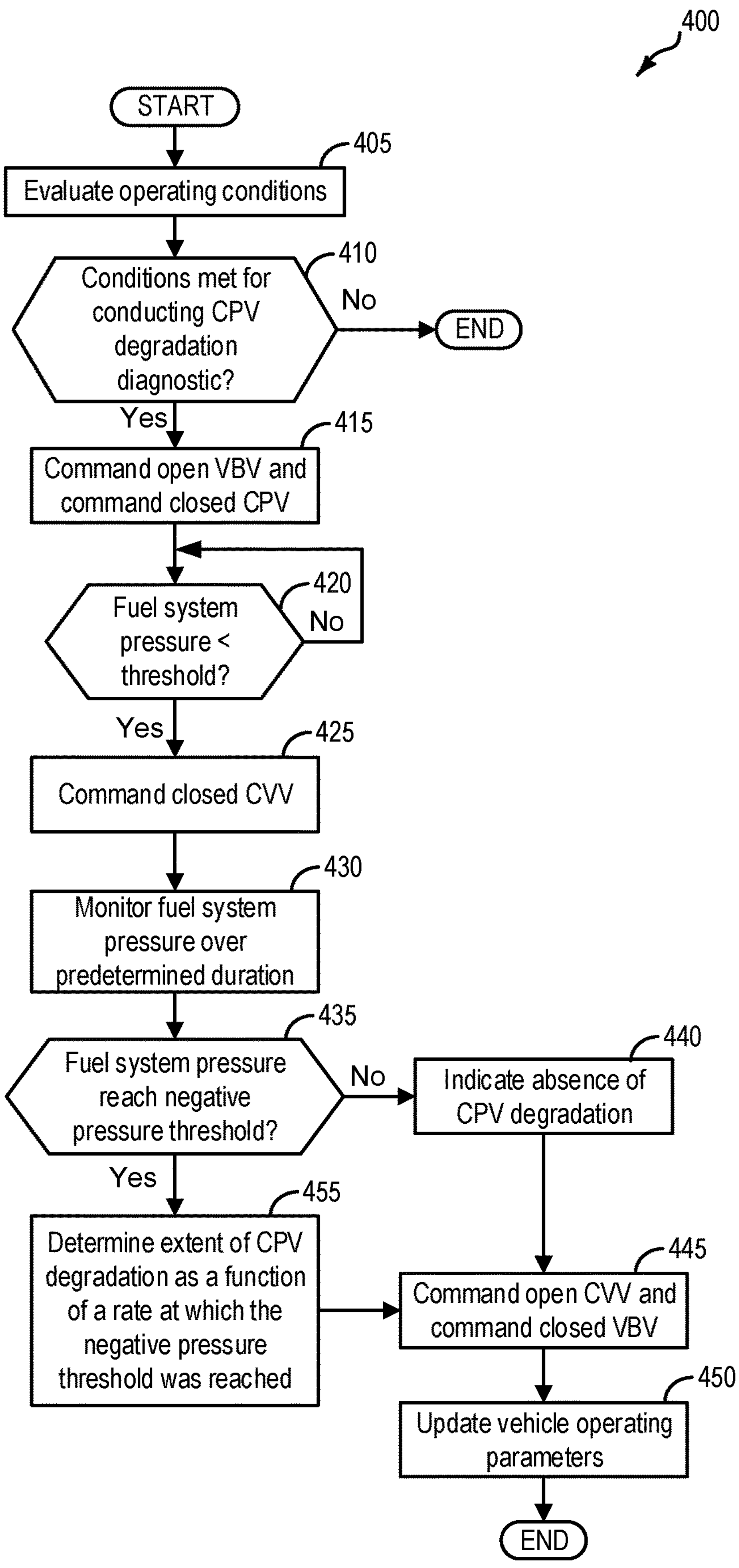
FIG. 4 depicts a flowchart for an example method for conducting a canister purge valve diagnostic to determine an extent of canister purge valve degradation.
Figure 6:
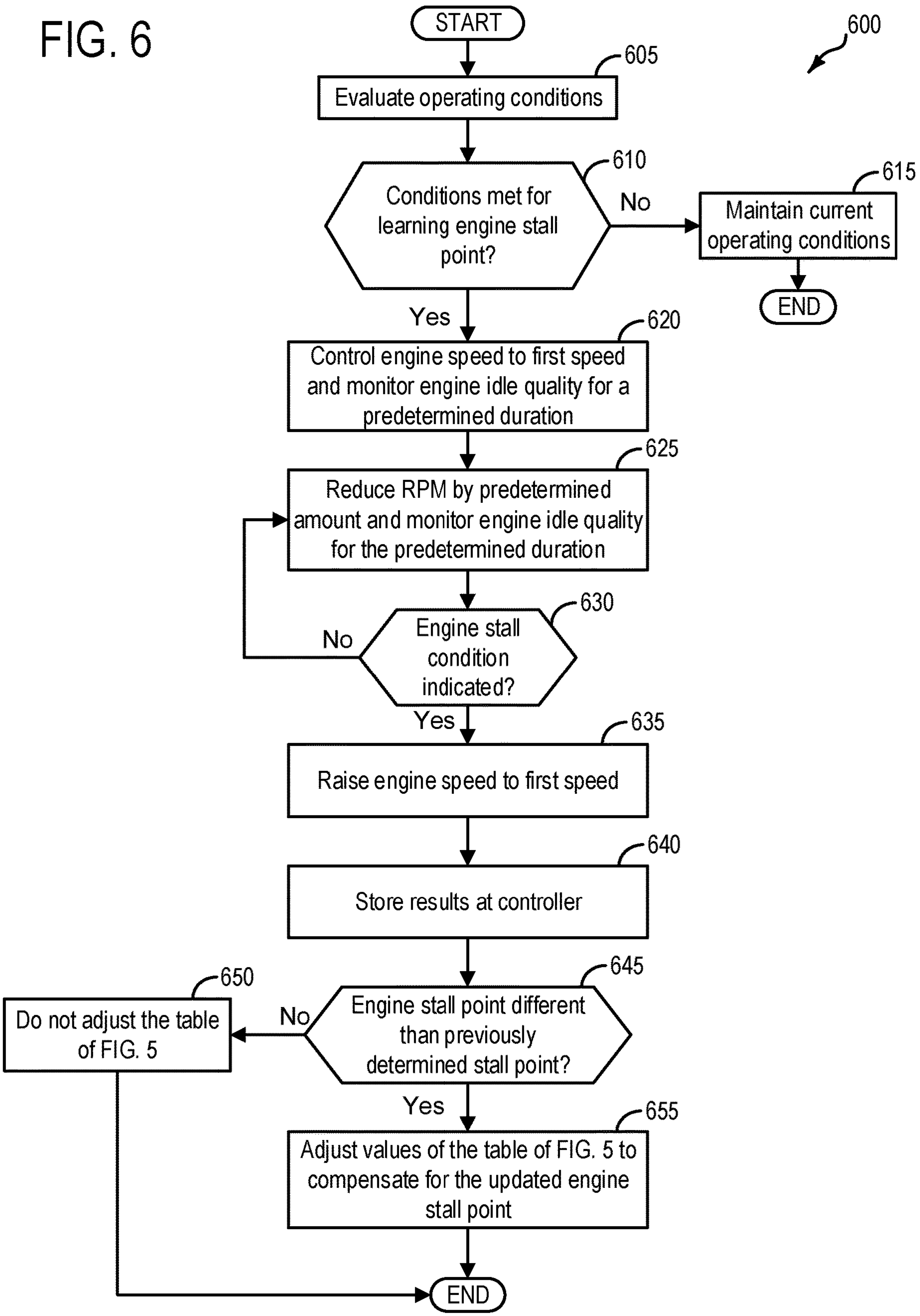
FIG. 6 depicts a flowchart for an example method for learning an engine stall point.
Figure 7:
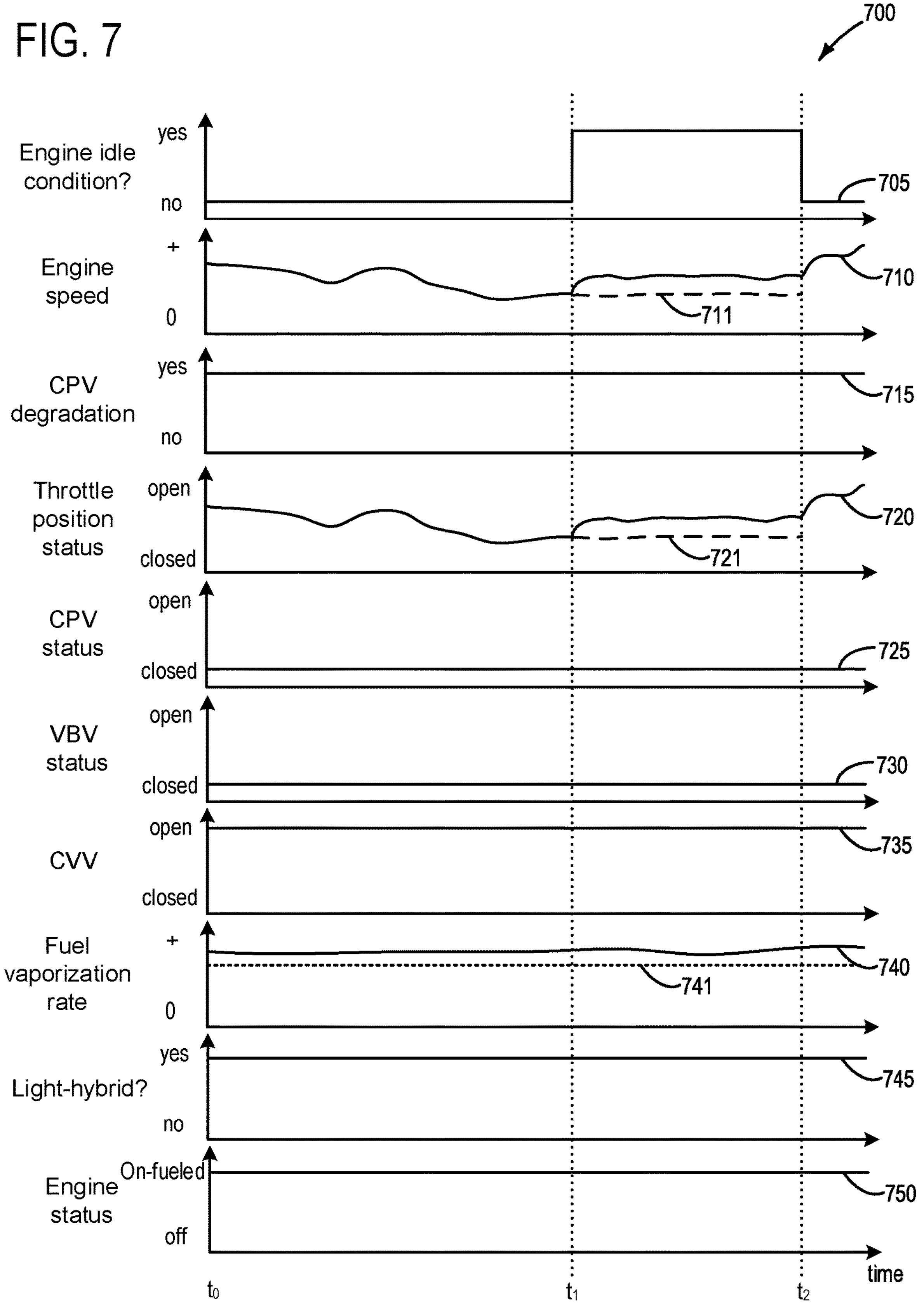
FIG. 7 depicts an example timeline for controlling engine idle speed under conditions where the canister purge valve is degraded.
Figure 8:
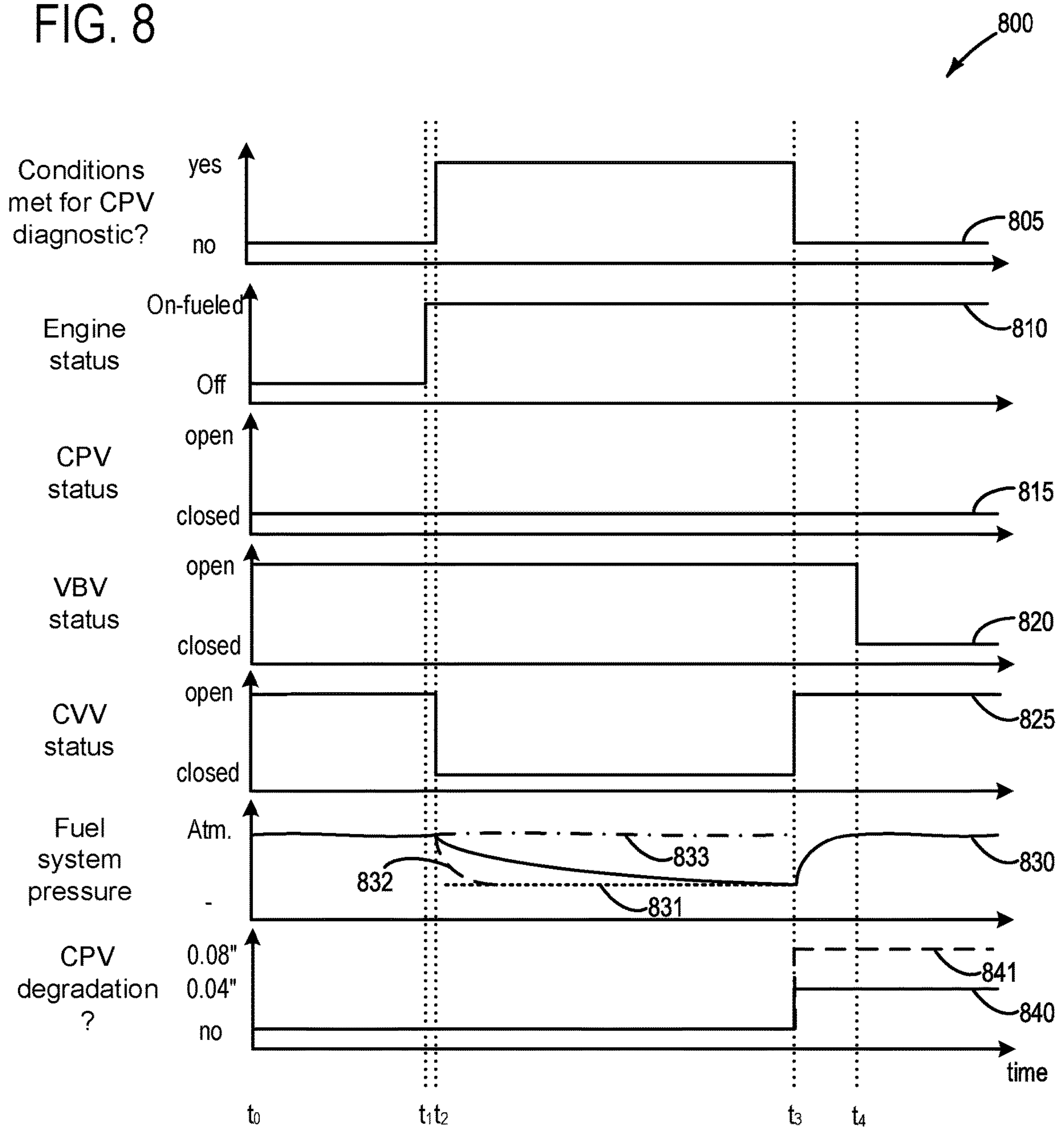
FIG. 8 depicts an example timeline for conducting a canister purge valve diagnostic according to the method of FIG. 4.

The following description relates to systems and methods for controlling an engine idle speed based on an extent to which a canister purge valve (CPV) that regulates a fluid flow from a fuel system and an evaporative emissions system to an engine, is degraded. Accordingly, depicted at FIG. 1 is a hybrid vehicle system including an engine, a fuel system and an evaporative emissions system. FIG. 2 depicts an example methodology for controlling engine idle speed to a compensated engine idle speed depending on the extent of CPV degradation and a current level of intake manifold vacuum. Depending on whether the vehicle is a light hybrid electric vehicle, a mild or full hybrid electric vehicle, or a non-hybrid regular gasoline engine, there may be different strategies pertaining to whether or not to shut the engine down at an idle stop event. For example, under conditions where the CPV is degraded and fuel vaporization is greater than a threshold fuel vaporization level, it may be preferable to maintain engine operation and control engine idle speed to the compensated engine idle speed, rather than shutting down the engine which may lead to degraded engine startup at the next engine startup request. Accordingly, methodology pertaining to such strategies is depicted at FIG. 3. As the methodologies discussed with regard to FIGS. 2-3 involve an indication of the extent to which the CPV is degraded, an example method for determining the extent of CPV degradation is depicted at FIG. 4. FIG. 5 depicts a lookup table that includes a plurality of compensated engine idle speeds as a function of the extent of CPV degradation determined via the methodology of FIG. 4, and intake manifold vacuum level. FIG. 6 depicts an example method for periodically determining an engine stall point as the engine ages over time, and the engine stall point may be used to update the compensated engine idle speed values stored at the lookup table of FIG. 5. An example timeline for controlling engine idle speed to the compensated engine idle speed according to the methods of FIGS. 2-3, is depicted at FIG. 7. An example timeline for determining the extent of CPV degradation according to the method of FIG. 4 is depicted at FIG. 8.

Turning now to FIG. 1, a schematic depiction of a hybrid vehicle system 6 is presented that can derive propulsion power from engine system 10 and/or an on-board energy storage device, such as a battery system (see below). An energy conversion device, such as a generator (see below), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. An oil temperature sensor 51 may be included in crankcase 28, and may monitor temperature of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12.

In some embodiments, each cylinder of engine 10 may include a spark plug 53 for initiating combustion. An ignition system (not shown) may provide an ignition spark to cylinder 34 via spark plug 53 in response to a spark advance signal from a controller, under select operating modes.

Throttle 42 may be disposed in the engine intake to control the airflow entering intake manifold 44 and may be preceded upstream by compressor 50 followed by charge air cooler 52, for example. Throttle 42 may comprise an electrically actuated throttle, in some examples. An air filter 54 may be positioned upstream of compressor 50 and may filter fresh air entering intake passage 13. The intake air may enter combustion chamber 34 via electrically-actuated intake valve system 40. Likewise, combusted exhaust gas may exit combustion chamber 34 via electrically-actuated exhaust valve system 41. In an alternate embodiment, one or more of the intake valve system and the exhaust valve system may be cam-actuated. Intake air may bypass compressor 50 via compressor bypass conduit 56, during conditions wherein compressor bypass valve (CBV) 55 is opened. In this way, pressure buildup at the compressor inlet may be relieved.

Each cylinder of engine 10 may include one or more intake valves and one or more exhaust valves. For example, cylinder 34 is shown including at least one intake valve 94 and at least one exhaust valve 95 located at an upper region of cylinder 34. The valves of cylinder 34 may in some examples be deactivated via hydraulically actuated lifters coupled to valve pushrods, or via a cam profile switching mechanism in which a cam lobe with no lift is used for deactivated valves. Still other valve deactivation mechanisms may also be used, such as electrically actuated valves. In one example, engine 10 may comprise a variable displacement engine (VDE) where each cylinder of engine 10 may be selectively deactivatable, where deactivatable refers to the ability of the controller to command both intake and exhaust valves closed for particular cylinder(s), thus sealing the particular cylinders. If fuel injection is also stopped, then such action may result in the particular cylinder(s) being essentially an air-spring. Accordingly, as depicted herein, in one embodiment, deactivation of intake valve 94 may be controlled by first VDE actuator 83 while deactivation of exhaust valve 95 may be controlled by second VDE actuator 84. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators. Cylinder 34 may have a compression ratio, which is the ratio of volumes when piston 38 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, a first intake air oxygen sensor 43*a* (first IAO2 sensor) may be positioned downstream of throttle 42. Furthermore, in some examples, an air intake system hydrocarbon (AIS HC) trap 47 may be positioned downstream of air filter 54, but upstream of compressor 50. Still further, in some examples, a second intake air oxygen sensor 43*b* (second IAO2 sensor) may be positioned upstream of the throttle 42. Second intake air oxygen sensor 43*b* may constitute an intake air oxygen sensor utilize for exhaust gas recirculation (EGR) purposes, for example, and may be used in vehicles in which fuel is injected directly, for example gasoline turbo direct injection (GTDI) engines.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Engine exhaust 60 may further include one or more emission control devices 63, also referred to herein as exhaust catalyst(s), mounted in a close-coupled position. The one or more emission control devices may include a three-way catalyst, lean NOx trap, diesel particulate filter, oxidation catalyst, etc. In some examples, multiple exhaust gas sensors may be positioned both upstream and downstream of emission control device 63. In some examples, an electric heater 119 may be coupled to the emission control device(s), and may be under control of the controller. Such an electric heater may be utilized in some examples to raise temperature of the emission control device to a light-off temperature, or otherwise referred to as operating temperature.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor, referred to herein as a crankcase pressure sensor (CKCP sensor) 77. When configured as a pressure sensor, CKCP sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). In some examples, an intake manifold pressure sensor 198 may be positioned in the intake manifold and may be relied upon as discussed in further detail below for inferring a current level of intake manifold vacuum. Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a PCV valve 78, which may be an electronically controlled valve that is controlled by controller 12. In another example, the PCV valve 78 may comprise a passively-actuatable mechanical valve. For example, the PCV valve may actively or passively vary its flow restriction in response to the pressure drop across it (or flow rate through it). Thus, in one example PCV valve 78 may be an electronically controlled valve wherein controller 12 may command a signal to change a position of the valve from a fully open position (or a position of high flow) to a fully closed position (or a position of no flow), or vice versa, or any position there-between. In another example, the PCV valve 78 may be passively actuated, as is commonly understood in the art.

The gases (referred to herein as blow-by gasses) in crankcase 28 may consist of un-burned fuel or un-combusted fuel, un-combusted fuel vapor, un-combusted air, and fully or partially combusted gases. Further, oil mist or vapor may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 44.

Engine system 10 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor storage canister 90 (also referred to herein as fuel vapor canister, or just canister), via conduit 93, before being purged to engine intake manifold 44.

Fuel vapor canister 90 (also referred to herein as fuel vapor storage canister, fuel canister, fuel vapor canister, or simply, canister) may be positioned in evaporative emissions system 19. Fuel vapor canister 90 is filled with an appropriate adsorbent for temporarily trapping fuel vapors (including vaporized hydrocarbons) generated during fuel tank refueling operations. In one example, the adsorbent used is activated charcoal. When purging conditions are met, such as when the canister is saturated, vapors stored in fuel vapor canister 90 may be purged to engine intake passage 13 by opening canister purge valve (CPV) 92. While a single canister 90 is shown, it will be appreciated that evaporative emissions system 19 may include any number of canisters. In one example, CPV 92 may be a solenoid valve wherein opening or closing of the valve is performed via actuation of a canister purge valve solenoid.

A hydrocarbon sensor 67 may be positioned in purge line 91. By incorporating hydrocarbon sensor 67, purging of the canister 90 may be optimized while maintaining a stoichiometric air/fuel ratio for engine combustion. More specifically, hydrocarbon sensor 67 may enable feed-forward air/fuel ratio control of engine combustion during purging of a fuel vapor storage canister. For example, based on an indication of hydrocarbon concentration being purged from the canister, an engine fueling strategy may compensate fuel injection pulses in order to maintain a stoichiometric air/fuel ratio, which may prevent a risk of engine stall, hesitation, etc., from a rich mixture of air and fuel.

Hydrocarbon sensor 67 may comprise an adsorption sensitive resistor which may operate on a principle of adsorption according to Vander Walls "a" constant, where an electrical resistance of the hydrocarbon sensor 67 varies with respect to fuel vapor concentration present. Discussed herein, output of the hydrocarbon sensor may be a function of the electrical resistance of the hydrocarbon sensor. For example, an output for a particular resistance may comprise a particular concentration of fuel vapor sensed via the hydrocarbon sensor.

Canister 90 may include a buffer (or buffer region) (not shown), each of the canister and the buffer comprising adsorbent. The volume of the buffer may be smaller than (e.g., a fraction of) the volume of canister 90. Adsorbent in the buffer may be same as, or different from, the adsorbent in the canister (e.g., both may include charcoal). The buffer may be positioned within canister 90 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 90 includes a vent line 86 for routing gases out of the canister 90 to the atmosphere when storing, or trapping, fuel vapors from fuel tank 20. Vent line 86 may also allow fresh air to be drawn into fuel vapor canister 90 when purging stored fuel vapors to engine intake passage 13 via purge line 91 and CPV 92. While this example shows vent 86 communicating with fresh, unheated air, various modifications may also be used. Vent 86 may include a canister vent valve (CVV) 87 to adjust a flow of air and vapors between canister 90 and the atmosphere. The canister vent valve may also be used for diagnostic routines. When included, the vent valve may be opened during fuel vapor storing operations (for example, during fuel tank refueling) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be a default-open valve that is closed upon actuation of the canister vent solenoid. In some examples, an air filter (not shown) may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a vapor bypass valve (VBV) 85 may be included in conduit 93 such that fuel tank 20 is coupled to canister 90 via the valve. VBV 85 may include a notch opening or orifice, such that even when closed, the fuel tank may be allowed to vent pressure through said notch opening or orifice. A size of the notch opening or orifice may be calibratable. In one example, the notch opening or orifice may comprise a diameter of 0.09", for example. During regular engine operation, VBV 85 may be kept closed to limit the amount of diurnal or "running loss" vapors directed to canister 90 from fuel tank 20. During refueling operations, and selected purging conditions, VBV 85 may be temporarily opened, e.g., for a duration, to direct fuel vapors from the fuel tank 20 to canister 90. While the depicted example shows VBV 85 positioned along conduit 93, in alternate embodiments, the VBV may be mounted on fuel tank 20.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor (also referred to herein as a fuel tank pressure transducer) coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and VBV 85.

One or more temperature sensors 24 may also be coupled to fuel system 18 for providing an estimate of a fuel system temperature. In one example, the fuel system temperature is a fuel tank temperature, wherein temperature sensor 24 is a fuel tank temperature sensor coupled to fuel tank 20 for estimating a fuel tank temperature. While the depicted example shows temperature sensor 24 directly coupled to fuel tank 20, in alternate embodiments, the temperature sensor may be coupled between the fuel tank and VBV 85. A canister temperature sensor 97 may be coupled to canister 90 and configured to indicate temperature changes of the adsorbent material within the canister. As fuel vapor adsorption is an exothermic reaction and fuel vapor desorption is an endothermic reaction, the canister temperature may be used to indicate a quantity of fuel vapor adsorbed during a venting event (e.g., during refueling and, which will be discussed further below, during a diagnostic to rationalize hydrocarbon sensor 67), and/or the quantity of fuel vapor desorbed during a purging operation.

Fuel vapors released from canister 90, for example during a purging operation, may be directed into engine intake manifold 44 via purge line 91. The flow of vapors along purge line 91 may be regulated by CPV 92, coupled between the fuel vapor canister and the engine intake. The quantity and rate of vapors released by the CPV may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. As discussed above, in some examples feed-forward air/fuel ratio control during purging of a fuel vapor storage canister may be utilized via the controller, based on a concentration of fuel vapors being directed to engine intake manifold 44, where the concentration of fuel vapors is measured via the hydrocarbon sensor 67.

By commanding the canister purge valve to be closed, the controller may seal the canister and evaporative emissions system from the engine intake.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open VBV valve 85 and CVV 87 while closing CPV 92 to direct refueling vapors into canister 90 while preventing fuel vapors from being directed into the intake manifold.

As another example, the fuel system may be operated in a refueling mode (e.g., when fuel tank refueling is requested by a vehicle operator), wherein the controller 12 may open VBV 85 and CVV 87, while maintaining CPV 92 closed, to depressurize the fuel tank before allowing fuel to be added therein. As such, VBV 85 may be kept open during the refueling operation to allow refueling vapors to be stored in the canister. After refueling is completed, the VBV may be closed.

As discussed, the fuel system may be operated in a canister purging mode (e.g., after an emission control device light-off temperature has been attained and with the engine running), wherein the controller 12 may open canister purge valve 92 and canister vent valve while closing VBV 85. Herein, the vacuum generated by the intake manifold of the operating engine may be used to draw fresh air through vent 86 and through fuel vapor canister 90 to purge the stored fuel vapors into intake manifold 44. In this mode, the purged fuel vapors from the canister are combusted in the engine. The purging may be continued until the stored fuel vapor amount in the canister is below a threshold. During purging, a learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. Such a vapor amount/concentration may be learned via the output of hydrocarbon sensor 67, in one example. Still further, in some examples the IAO2 sensor 43*a* may be utilized to learn the vapor amount/concentration. Additionally or alternatively, exhaust gas sensor 64 may be used to learn the vapor amount/concentration.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; exhaust temperature sensor 65; crankcase vent tube pressure sensor 77, BP sensor 57, CIP sensor 61, TIP sensor 59, canister temperature sensor 97, hydrocarbon sensor 67, etc. Furthermore, controller 12 may monitor and adjust the position of various actuators 118 based on input received from the various sensors. These actuators may include, for example, throttle 42, intake and exhaust valve systems 40, 41, PCV valve 78, CPV 92, VBV 85, CVV 87, etc. Storage medium read-only memory 112 can be programmed with computer readable data representing instructions executable by processor 108 for performing the methods described below, as well as other variants that are anticipated but not specifically listed.

Controller 12 may also be configured to intermittently perform undesired evaporative emission detection routines on fuel system 18 and/or evaporative emissions system 19. Tests may be performed by an evaporative level check module (ELCM) 99 communicatively coupled to controller 12. ELCM 99 may be coupled in vent 86, between canister 90 and the atmosphere. ELCM 99 may include a vacuum pump for applying negative pressure to the fuel system and/or evaporative emission system when administering a test. In some embodiments, the vacuum pump may be configured to be reversible. In other words, the vacuum pump may be configured to apply either a negative pressure or a positive pressure on the fuel system and/or evaporative emissions system. ELCM 99 may further include a reference orifice and a pressure sensor 98. The reference orifice may enable a threshold pressure to be determined based on current ambient and operating conditions.

Furthermore, while not explicitly illustrated, ELCM 99 may include a changeover valve that, when actuated via the controller to a first position, couples the ELCM to atmosphere, and when actuated to a second position, seals the ELCM from atmosphere. Thus, in some examples where the ELCM is included, the CVV may or may not be additionally included. However, in a situation where the ELCM is not included, the CVV may be included. Following the applying of vacuum to the fuel system and/or evaporative emissions system, a change in pressure at pressure sensor 98 (e.g., an absolute change or a rate of change) may be monitored and compared to the threshold pressure. Based on the comparison, the fuel system and/or evaporative emissions system may be diagnosed for a presence or absence of undesired evaporative emissions. As such, various diagnostic detection tests may be performed while the engine is off (engine-off test) or while the engine is running (engine-on test). Tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). It may be understood that such a test may be performed via the ELCM (where included), and/or may additionally or alternatively be performed via relying on vacuum generated from the engine. Tests performed while the engine is not running may include sealing the fuel system and/or evaporative emissions system following engine shut-off and monitoring a change in fuel system and/or evaporative emissions system pressure. This type of test is referred to herein as an engine-off natural vacuum test (EONV). In sealing the fuel system and/or evaporative emissions system following engine shut-off, a vacuum may develop in the fuel system and/or evaporative emissions system as the tank cools and fuel vapors are condensed to liquid fuel. The amount of vacuum and/or the rate of vacuum development may be compared to expected values. In another example, at a vehicle-off event, as heat continues to be rejected from the engine into the fuel tank, the fuel system pressure and/or evaporative emissions system pressure may initially rise. During conditions of relatively high ambient temperature, a pressure build above a threshold may be considered a passing test.

As discussed, hybrid vehicle system 6 may include multiple sources of torque available to one or more vehicle wheels 171, however, in other examples, the vehicle may include an engine without other sources of torque available. In the example shown, hybrid vehicle system 6 includes an electric machine 152. Electric machine 152 may be a motor or a motor/generator. Crankshaft 30 of engine 10 and electric machine 152 are connected via a transmission 154 to vehicle wheels 171 when one or more clutches 172 are engaged. In the depicted example, a first clutch is provided between crankshaft 30 and electric machine 152, and a second clutch is provided between electric machine 152 and transmission 154. Controller 12 may send a signal to an actuator of each clutch 172 to engage or disengage the clutch, so as to connect or disconnect crankshaft from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 (also described herein as onboard energy storage device, energy storage device, or battery) to provide torque to vehicle wheels 171. Electric machine 152 may also be operated as a generator to provide electrical power to charge traction battery 158, for example during a braking operation.

Onboard energy storage device 158 may periodically receive electrical energy from a power source 191 residing external to the vehicle (e.g., not part of the vehicle) as indicated by arrow 192. As a non-limiting example, hybrid vehicle system 6 may be configured as a PHEV, whereby electrical energy may be supplied to energy storage device 158 from power source 191 via an electrical energy transmission cable 193. During a recharging operation of energy storage device 158 from power source 191, electrical transmission cable 193 may electrically couple energy storage device 158 and power source 191. While the vehicle propulsion system is operated to propel the vehicle, electrical transmission cable 193 may disconnected between power source 191 and energy storage device 158. Controller 12 may identify and/or control the amount of electrical energy stored at the energy storage device, which may be referred to as the state of charge (SOC).

In other examples, electrical transmission cable 193 may be omitted, where electrical energy may be received wirelessly at energy storage device 158 from power source 191. For example, energy storage device 158 may receive electrical energy from power source 191 via one or more of electromagnetic induction, radio waves, and electromagnetic resonance. As such, it may be appreciated that any suitable approach may be used for recharging energy storage device 158 from a power source that does not comprise part of the vehicle.

Hybrid vehicle system 6 may include an exhaust gas recirculation (EGR) system. Specifically, the EGR system may include one or more of high pressure EGR, or low pressure EGR. In the example illustration depicted at FIG. 1, a low pressure EGR system is illustrated. Specifically, an EGR passage is indicated, the EGR passage comprising passage **162*a* and 162*b*. It may be understood that passage 162*a* and 162*b* may comprise the same EGR passage, but is indicated as a broken passage for clarity. The EGR passage comprising passage 162*a* and 162*b* may further include EGR valve 164. By controlling timing of opening and closing of EGR valve 164**, an amount of exhaust gas recirculation may be appropriately regulated.

In some examples, hybrid vehicle system 6 may include an onboard navigation system 199 (for example a Global Positioning System) that an operator of the vehicle may interact with. The navigation system 199 may include one or more location sensors for assisting in estimating vehicle speed, vehicle altitude, vehicle position/location, etc. This information may be used to infer engine operating parameters, such as local barometric pressure, an engine idle event, etc. Controller 12 may in some examples further be configured to receive information via the internet or other communication networks. Information received from the GPS may be cross-referenced to information available via the internet to determine local weather conditions, local vehicle regulations, traffic information, etc. In one example, information received from the GPS may be utilized in conjunction with route learning methodology, such that routes commonly traveled by a vehicle, or commonly traveled by a particular vehicle operator, or commonly traveled by a passenger (in the case of an autonomous vehicle) may be learned over time. In some examples, other sensors 133, such as lasers, radar, sonar, acoustic sensors, etc., may be additionally or alternatively utilized in conjunction with the onboard navigation system to conduct route learning of commonly traveled routes by the vehicle. The GPS may in some examples also provide suggested routes for a vehicle to take, depending on current vehicle operating conditions, current traffic conditions, etc.

In some examples, hybrid vehicle system 6 may include occupancy sensors 185 dedicated to indicating the occupancy state of the vehicle, for example one or more of seat load cells, door sensing technology and/or onboard camera (s).

As discussed above, under situations where the CPV (e.g. 92) is degraded, engine operation may result in a drawing of fuel vapors through the degraded CPV and into the engine. Such a situation may be exacerbated during an engine idle condition, where engine manifold vacuum is increased and where engine speed (e.g. engine RPM) is decreased in comparison to, for example, transient or other driving conditions. At engine idle where engine speed is low, the engine may be susceptible to hesitation and/or stall events if unintended fuel vapor (and/or fresh air) enters the engine by way of the degraded CPV.

Thus, discussed herein, a system for a vehicle may comprise a canister purge valve that controls an amount of air and fuel vapor routed to an engine from a fuel system and an evaporative emissions system. The system may further comprise a controller with computer readable instructions stored on non-transitory memory that when executed cause the controller to, responsive to an indication that the canister purge valve is degraded and further in response to an engine idle condition being inferred, controlling an engine speed to a compensated engine idle speed as a function of an extent to which the canister purge valve is degraded and a vacuum level in an intake manifold of the engine.

For such a system, the system may further comprise a throttle that regulates intake air flow to the engine, where the throttle is electronically actuatable. The controller may store further instructions to control the throttle in order to control the engine speed to the compensated engine idle speed.

For such a system, the system may further comprise a canister vent valve positioned in a vent line stemming from a fuel vapor storage canister included in the evaporative emissions system, a vapor bypass valve positioned in a conduit that couples the fuel system to the evaporative emissions system, and a fuel tank pressure transducer. The controller may store further instructions to, with the engine combusting air and fuel, command closed the canister purge valve and the canister vent valve and command open the vapor bypass valve. The controller may store further instructions to monitor a rate at which a negative pressure threshold is reached, the monitoring via the fuel tank pressure transducer, and indicate the extent to which the canister purge valve is degraded based on the rate at which the negative pressure threshold is reached.

For such a system, the system may further comprise a lookup table stored at the controller that returns the compensated engine idle speed based on the extent to which the canister purge valve is degraded and the vacuum level in the intake manifold of the engine. The controller may store further instructions to update the compensated engine idle speed based on a learned engine stall point, the learned engine stall point determined after the vehicle has been driven a predetermined number of miles since a prior learned engine stall point was determined.

One approach to avoid engine hesitation and/or stall may be to simply raise engine speed a fixed arbitrary or predetermined amount under conditions of a degraded CPV. However, in relying on such a strategy, in order to account for varying degrees of CPV degradation the fixed amount may be excessive for a current extent or level of CPV degradation. Raising engine speed to a fixed level may thus in some examples undesirably decrease fuel economy and contribute to higher than desired levels of noise, vibration and harshness (NVH).

Accordingly, a smart method for raising engine idle speed based on a measured extent of CPV degradation may reduce chances for engine hesitation and/or stall under conditions of CPV degradation, while also avoiding a reduction in fuel economy and while further reducing issues related to NVH. Thus, turning to FIG. 2, a high level example method 200 is shown, depicting methodology for compensating engine idle speed as a function of a degree or extent to which the CPV is degraded. Method 200 will be described with reference to the systems described herein and shown in FIG. 1, though it will be appreciated that similar methods may be applied to other systems without departing from the scope of this disclosure. Instructions for carrying out method 200 and the rest of the methods included herein may be executed by a controller, such as controller 12 of FIG. 1, based on instructions stored in non-transitory memory, and in conjunction with signals received from sensors of the engine system, such as temperature sensors, pressure sensors, and other sensors described in FIG. 1. The controller may employ actuators such as throttle (e.g. 42), CPV (e.g. 92), CVV (e.g. 87), VBV (e.g. 85), etc., to alter states of devices in the physical world according to the methods depicted below.

Method 200 begins at 205 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 210, method 200 may include indicating whether an engine idle condition is inferred. The engine idle event may be inferred based on a vehicle deceleration event, where the controller infers an upcoming engine idle event within a predetermined threshold duration (e.g. within 1-2 seconds or less). Additionally or alternatively, the engine idle event may be inferred based on information retrieved via the onboard navigation system. For example, based on information retrieved from the onboard navigation system related to vehicle location, traffic light(s) or stop signs, current traffic density, etc., the controller may infer an upcoming engine idle event within the predetermined threshold duration. In yet another additional or alternative example, an engine idle event may be inferred as a function of a deceleration fuel shut off (DFSO) event. For example, in response to an indication that a DFSO event has ended, the engine may be fueled at an engine idle speed.

Accordingly, if an engine idle condition is not inferred at 210, method 200 may proceed to 215. At 215, method 200 may include maintaining current operating conditions. For example, if the engine is in operation, current engine operating parameters may be maintained. If the engine is not in operation, such operation may be maintained. Furthermore, position of valves including but not limited to the CPV, VBV, CVV, etc., may be maintained in their current operational status. Method 200 may then end.

Returning to 210, in response to an engine idle condition being inferred, method 200 may proceed to 220. At 220, method 200 may include indicating whether CPV degradation is indicated. If there is no indication that the CPV is degraded to any extent, method 200 may proceed to 215, where current operating conditions may be maintained. Specifically, there may be a base engine idle speed for a given current level of intake manifold vacuum that is used under conditions where the CPV is not degraded. In such a condition where the engine idle condition is inferred but where the CPV is not degraded, maintaining current operating conditions at 215 may include controlling the engine speed to the base engine idle speed for the current level of intake manifold vacuum (refer to the lookup table of FIG. 5, which will be elaborated in further detail below). Method 200 may then end.

Returning to 220, in response to an indication that the CPV is degraded, method 200 may proceed to 225. At 225, method 200 may retrieve the extent to which the CPV is degraded from the controller. Specifically, the extent to which the CPV is degraded may be determined via the methodology of FIG. 4. Accordingly, the methodology of FIG. 4 will now be discussed. Method 400 will be described with reference to the systems described herein and shown in FIG. 1, though it will be appreciated that similar methods may be applied to other systems without departing from the scope of this disclosure. Instructions for carrying out method 400 may be executed by a controller, such as controller 12 of FIG. 1, based on instructions stored in non-transitory memory, and in conjunction with signals received from sensors of the engine system, such as temperature sensors, pressure sensors, and other sensors described in FIG. 1. The controller may employ actuators such as throttle (e.g. 42), CPV (e.g. 92), CVV (e.g. 87), VBV (e.g. 85), etc., to alter states of devices in the physical world according to the methods depicted below.

Method 400 begins at 405 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 410, method 400 includes indicating whether conditions are met for conducting the CPV degradation diagnostic. In one example, conditions may be met at a cold start event where fuel temperature is measured or inferred to be below a predetermined fuel temperature. Additionally or alternatively, conditions being met at 410 may include an estimated or inferred fuel vaporization rate below a predetermined fuel vaporization rate threshold. Additionally or alternatively, conditions being met at 410 may include a threshold duration of time elapsing since a prior CPV diagnostic was conducted. Additionally or alternatively, conditions being met at 410 may include the vehicle being stationary. However, in other examples, conditions being met at 410 may include a steady-state cruise condition, without departing from the scope of this disclosure. Conditions being met at 410 may additionally or alternatively include an intake manifold vacuum greater than a predetermined threshold vacuum. Conditions being met at 410 may additionally or alternatively include an indication of an absence of a source of undesired evaporative emissions stemming from the fuel system and/or evaporative emissions system. In other words, if there is an indication of fuel system or evaporative emissions system degradation in the form of a source of undesired evaporative emissions, then conditions may not be met for conducting the CPV degradation diagnostic.

In response to conditions being met for conducting the CPV diagnostic at 410, method 400 may proceed to 415. At 415, method 400 may include commanding open the VBV (e.g. 85) and commanding closed the CPV (e.g. 92). While not explicitly illustrated, it may be understood that at 415, method 400 may further include commanding open the CVV (e.g. 87), in a situation where the CVV is not already open.

Continuing to 410, method 400 may include indicating whether fuel system pressure is less than a predetermined fuel system pressure threshold. The predetermined fuel system pressure threshold may be within a predetermined pressure from atmospheric pressure, for example. In other words, prior to conducting the CPV diagnostic, pressure in the fuel system and evaporative emissions may first be relieved, to within the predetermined pressure from atmospheric pressure as set by the predetermined fuel system pressure threshold. In this way, existing pressure in the fuel system and/or evaporative emissions system may be relieved so as to not impact the CPV diagnostic, discussed in further detail below.

Once fuel system and evaporative emissions system pressure has been relieved, method 400 may proceed to 425. At 425, method 400 may include commanding closed the CVV. With the CPV closed as well as the CVV, method 400 may proceed to 430. At 430, method 400 may include monitoring pressure in the fuel system and evaporative emissions system over a predetermined duration. In one example, the fuel tank pressure transducer (e.g. 23) may be relied upon for monitoring pressure in the fuel system and evaporative emissions system. In another example where an ELCM (e.g. 99) is included in the vehicle, the ELCM pressure sensor (e.g. 98) may additionally or alternatively be relied upon for monitoring pressure in the fuel system and evaporative emissions system.

Continuing at 435, method 400 may include indicating whether pressure in the fuel system and evaporative emissions system reached a negative pressure threshold while pressure was being monitored over the predetermined duration. In one example, the negative pressure threshold may comprise −4 $InH_2O$, however the negative pressure threshold may in other examples comprise any negative pressure in a range of −8 $InH_2O$ to −2 $InH_2O$.

If, at 435, it is indicated that the negative pressure threshold was not reached, method 400 may proceed to 440, where it may be indicated that that the CPV is not degraded to any appreciable extent. In other words, at 440, an absence of CPV degradation may be indicated. Specifically, as mentioned above, an entry condition for the CPV diagnostic may include an indication that the fuel system and evaporative emissions system are free from sources of undesired evaporative emissions. Thus, in a case where the negative pressure threshold is not reached at 435, it may be understood that the reason is not due to a source of gross undesired evaporative emissions that is preventing the negative pressure threshold from being reached, but rather is due to the CPV effectively sealing and preventing engine manifold vacuum from being communicated to the fuel system and evaporative emissions system. Accordingly, with the absence of CPV degradation indicated at 440, method 400 may proceed to 445. At 445, method 400 may include commanding open the CVV, and may further include commanding closed the VBV. In some examples, the VBV may be commanded closed once pressure in the fuel system and evaporative emissions system is relieved. Although, because the VBV includes a small orifice as discussed above, in other examples the VBV may be commanded closed at a substantially similar time (e.g. within one or two seconds) as when the CVV is commanded open.

Proceeding to 450, method 400 may include updating vehicle operating parameters. Specifically, in a case where the CPV was found to not be degraded to any appreciable extent, updating vehicle operating parameters at 450 may include storing the result at the controller, and maintaining current engine idle speed settings. In other words, because there is an indication of an absence of CPV degradation, any stored settings pertaining to engine idle speed may be maintained without being modified. Method 400 may then end.

Alternatively, returning to 435, in a case where pressure in the fuel system and evaporative emissions system was reduced to the negative pressure threshold, method 400 may proceed to 455. At 455, method 400 may include determining the extent to which the CPV is degraded as a function of a rate at which the negative pressure threshold was reached. For example, it may be understood that as CPV degradation increases, the rate at which the negative pressure threshold is reached may be faster. Alternatively, lesser CPV degradation may correspond to slower rates at which the negative pressure threshold is reached. Said another way, the faster the negative pressure threshold is reached for the CPV degradation diagnostic, the greater the extent of CPV degradation. Conversely, the slower the negative pressure threshold is reached for the CPV degradation diagnostic, the lesser the extent of CPV degradation.

The rate at which the negative pressure threshold is reached may be dependent on a number of other variables, in addition to the extent of CPV degradation. For example, the rate at which the negative pressure threshold is reached may be slower, for a given extent of CPV degradation, when there is a lesser intake manifold vacuum magnitude, as compared to a faster rate for the same given extent of CPV degradation, when there is a greater (e.g. more negative) intake manifold vacuum magnitude. Accordingly, determination of the extent of CPV degradation may further be a function of a level of intake manifold vacuum magnitude during the CPV degradation diagnostic.

In another additional or alternative example, the rate at which the negative pressure threshold is reached may be a function of fuel vaporization level of fuel in the fuel tank during the CPV degradation diagnostic. More specifically, fuel vaporization may counter the buildup of negative pressure in the fuel system and evaporative emissions system, thus resulting in the rate at which the negative pressure threshold is reached being slower under conditions where fuel vaporization is an issue to contend with. Accordingly, determination of the extent of CPV degradation may further be a function of a level of fuel vaporization during the CPV degradation diagnostic. The level of fuel vaporization may be a function of ambient temperature and fuel RVP, and thus determining the extent of CPV degradation may further include compensating for current ambient temperature and fuel RVP.

In yet another additional or alternative example, the rate at which the negative pressure threshold is reached may be a function of fuel level in the fuel tank. For example, as fuel level decreases, it may take more time for the negative pressure threshold to be reached, as compared to situations where fuel level is higher. Accordingly, determining the extent of CPV degradation may further include compensating for current fuel level in the fuel tank.

Based on the above, it may be understood that determining the extent of CPV degradation may include determining the rate at which the negative pressure threshold is reached, and compensating the rate and thereby the extent of CPV degradation as a function of one or more of the current rate of fuel vaporization, current ambient temperature, current fuel level, fuel RVP, current level of intake manifold vacuum, etc.

Determining the extent of CPV degradation as a function of the above-mentioned variables may include the controller comparing said variables to one or more lookup tables stored at the controller, to infer the extent of CPV degradation. In other examples, values pertaining to the above-mentioned variables along with the rate at which the negative pressure threshold was reached may be input into a formula or model stored at the controller, which may output a result corresponding to the extent of CPV degradation. As an example, consider a CPV with a 0.02" diameter source of degradation, such that when commanded closed, the engine manifold vacuum draws air and/or fuel vapors through the 0.02" diameter source. By comparing the rate at which the negative pressure threshold was reached, and compensating for current level of intake manifold vacuum, current level of fuel vaporization, current ambient temperature, fuel RVP, fuel level, etc., it may be indicated that the CPV includes a 0.02" source of degradation. Thus, discussed herein, CPV degradation refers to a degree to which the CPV is not properly sealing. In one example, the CPV may be not properly sealing such that there remains a 0.02" diameter opening that air and/or fuel vapor may be able to travel through. In other examples where the CPV is degraded to a greater extent, the opening associated with the non-sealing CPV may be greater than 0.02" in diameter. The values for CPV degradation discussed herein (e.g. 0.02", 0.04", etc.) may be approximate in some examples. For example, it may be determined that the source of degradation of the CPV is approximately 0.02" in diameter.

With the extent of CPV degradation determined at 455, method 400 may proceed to 445. At 445, method 400 may include commanding open the CVV, and may further include commanding closed the VBV, in similar fashion as that discussed above. Proceeding to 450, method 400 may include updating vehicle operating parameters. Updating vehicle operating parameters may include storing the results of the CPV degradation diagnostic at the controller. Updating vehicle operating parameters may in some examples additionally or alternatively include setting diagnostic trouble code and illuminating a malfunction indicator light (MIL) at the vehicle dash, alerting the vehicle operator of a request to service the vehicle. Updating vehicle operating parameters may additionally or alternatively include using the obtained extent of degradation of the CPV to update a lookup table that is used to by the controller to regulate engine idle speed as a function of engine intake manifold vacuum. Specifically, based on the determined extent of CPV degradation, current values of engine idle speed may be increased as a function of the extent of CPV degradation and intake manifold vacuum. In this way, engine speed at idle may be increased to compensate for the extra fuel vapor and/or air being drawn into the engine while the engine is idling or fueled at engine idle speed, which may prevent or reduce issues related to engine hesitation and/or stall which may otherwise occur if the CPV degradation were not accounted for by raising engine idle speed. Method 400 may then end.

Turning to FIG. 5, an example illustration 500 is shown, depicting a lookup table that determines engine idle speed as a function of the extent of CPV degradation and intake manifold vacuum. While not explicitly illustrated, it may be understood that in some examples, the determined engine idle speed may further be modified or compensated for as a function of a current level of fuel vaporization.

Briefly, in a case where there is a 0.0" source of degradation, it may be understood that there is an absence of CPV degradation. Accordingly, engine idle speed may be determined as a function of intake manifold vacuum level. Discussed herein, when there is an absence of CPV degradation, engine idle speeds at different levels of intake manifold vacuum may be referred to as base engine idle speeds. Intake manifold vacuum level may be monitored, for example, via the intake manifold pressure sensor (e.g. 198). In other examples, intake manifold vacuum level may be determined as a pressure difference across the CPV (e.g. manifold pressure–fuel system pressure).

In a case where the CPV is degraded, see for example 0.02" source of degradation, the engine idle speed may be raised a predetermined amount as a function of intake manifold vacuum level, from the base engine idle speeds. As can be seen from the lookup table depicted at FIG. 5, as the extent of CPV degradation increases, compensated engine idle speed correspondingly increases as a function of intake manifold vacuum level. Thus, as an example, in a case where there is a 0.08" source of CPV degradation and intake manifold vacuum is −16 InHg, engine idle speed may be raised from 110 RPM (in the case of an absence of CPV degradation) to 190 RPM in order to compensate for the fuel vapors and/or air expected to be inducted to the engine via the degraded CPV.

Returning now to step 225 at FIG. 2, it may be understood that the above-described methodology of FIG. 4 may be used to determine the extent of CPV degradation, which may be stored at the controller. Accordingly, at step 225 of FIG. 2, in response to an engine idle condition where the CPV is indicated to be degraded, method 200 may include retrieving the current extent of CPV degradation from the controller, the current extent of CPV degradation stored at the controller based on the outcome of the control methodology depicted at FIG. 4.

Continuing to 230, method 200 may include determining engine idle speed as a function of the current level of CPV degradation, and as a function of the current level of intake manifold vacuum, as discussed above with regard to FIG. 5. In other words, the controller may use the lookup table of FIG. 5 in order to determine engine idle speed.

Once engine idle speed is determined at 230, method 200 may include controlling engine idle speed to the compensated engine idle speed based on the value pulled from the lookup table of FIG. 5. Controlling engine idle speed to the compensated engine idle speed may include commanding the throttle to a more open position, such that an increased air charge may be delivered to the engine, thereby increasing engine speed.

Proceeding to 240, method 200 may include indicating whether conditions are met for discontinuing controlling engine speed to the compensated engine idle speed. In other words, in response to a request for vehicle acceleration or some other request (e.g. an engine-off event) such that the engine is no longer requested to be controlled at the compensated engine idle speed, method 200 may proceed to 245, where current engine operating parameters may be updated. Updating current engine operating parameters at 245 may include controlling engine operation as a function of the request that resulted in the exit from engine idle. As an example, in response to a request for vehicle acceleration, the fueling, spark and the throttle may be controlled so as to meet the acceleration request via the engine. Method 200 may then end.

While a degraded CPV may allow for fuel vapors to be drawn into the engine at engine idle with the engine combusting air and fuel, it is herein recognized that there are certain types of vehicles which may shut down the engine at idle-stop events. While shutting down the engine may serve to avoid engine hesitation and/or engine stall issues which may otherwise occur if the engine were left combusting in the presence of a degraded CPV, a degraded CPV may allow for fuel vapors to migrate to the intake manifold of the deactivated engine, which may cause a degraded engine start event (e.g. hesitation, misfire, long crank time, etc.) upon the engine being commanded to again combust air and fuel.

Accordingly, turning now to FIG. 3, a high-level example method 300 is depicted, illustrating how engine operation may be controlled under circumstances where the CPV is indicated to be degraded to some extent, and where the controller includes instructions to shut down the engine at idle-stop events. Method 300 will be described with reference to the systems described herein and shown in FIG. 1, though it will be appreciated that similar methods may be applied to other systems without departing from the scope of this disclosure. Instructions for carrying out method 300 may be executed by a controller, such as controller 12 of FIG. 1, based on instructions stored in non-transitory memory, and in conjunction with signals received from sensors of the engine system, such as temperature sensors, pressure sensors, and other sensors described in FIG. 1. The controller may employ actuators such as throttle (e.g. 42), CPV (e.g. 92), CVV (e.g. 87), VBV (e.g. 85), etc., to alter states of devices in the physical world according to the methods depicted below.

Method 300 begins at 305 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 310, method 300 includes indicating whether the CPV is degraded as discussed with regard to the methodology of FIG. 4. If the CPV is not indicated to be degraded to any appreciable extent, method 400 may end. Alternatively, if the CPV is indicated to be degraded as per the methodology of FIG. 4, method 300 may proceed to 315. At 315, method 300 may include indicating whether an idle stop condition is inferred. Specifically, the idle stop condition of step 315 may comprise an upcoming (e.g. within 1-2 seconds) vehicle stop event where the vehicle is expected to come to a complete stop and where the engine may be stopped. Similar to that discussed above at FIG. 2, inferring the idle stop event may be based on information retrieved from the onboard navigation system, and/or inferred based on vehicle speed, learned driving routines, etc.

If, at 315, an idle stop condition is not inferred, method 300 may proceed to 320. At 320, method 300 may include maintaining current operating conditions. For example, if the engine is operating to propel the vehicle, such engine operation may be maintained. If the vehicle is being propelled, at least in part, via electrical energy, such operating conditions may be maintained. A current status of valves including but not limited to the CPV, VBV, and CVV may be maintained. Method 300 may then end.

Returning to 315, in response to the idle stop condition being inferred, method 300 may proceed to 325. At 325, method 300 may include estimating the fuel vaporization rate. For example, the fuel vaporization rate may be estimated as a function of one or more of fuel RVP, ambient temperature, engine run-time, mass air flow summed over the duration of the current drive cycle, fuel level, fuel system pressure (and in some examples evaporative emissions system pressure as well), current environmental conditions (e.g.

wind, rain, snow, etc.), etc. For vehicles with a VBV, fuel vaporization rate may be inferred by commanding closed the VBV, and monitoring a rate at which pressure in the fuel tank builds. For example, any standing pressure in the fuel tank may be relieved via coupling the fuel tank to atmosphere, and then the VBV may be commanded closed. The rate at which pressure builds may be monitored via the FTPT to infer fuel vaporization rate. In another example case for vehicles that do not include a VBV, vaporization rate may be inferred based on output from a hydrocarbon sensor positioned in the canister load line (e.g. 93). In yet another example, fuel vaporization rate may be inferred via the use of temperature sensor(s) (e.g. 97) configured to monitor canister temperature changes. For example, during a purging event where the canister is being desorbed of fuel vapor, a heat gain instead of an expected temperature drop may indicate a high rate of fuel vaporization, or in other words, fuel vaporization greater than a threshold fuel vaporization rate (see below). In yet another example, a fuel vaporization rate greater than the threshold fuel vaporization rate may be inferred during a canister purging event where, after a threshold number of liters of air have been inferred to have flowed through the canister (e.g. for a 2 L canister, 600 L of air), the exhaust gas oxygen sensor (e.g. HEGO) is continuing to register a rich response.

With the fuel vaporization rate determined at 325, method 300 may proceed to 330. At 330, method 300 may include indicating whether the vehicle comprises a non-hybrid vehicle or “light hybrid” equipped with stop/start capabilities. Such a vehicle may be capable of shutting down the engine when the vehicle is coming to a stop, and then restarting the engine when a request for acceleration is received, but may not be capable of rotating the engine unfueled via a motor that receives power from an onboard energy storage device (e.g. battery). If, at 330, it is indicated that the vehicle is a non-hybrid or light hybrid with stop/start capabilities, method 300 may proceed to 335. At 335, method 300 may include indicating whether the fuel vaporization rate is greater than a threshold fuel vaporization rate. The threshold fuel vaporization rate may comprise a rate where, even with the VBV closed (but with the predetermined orifice size included therein) and with the CPV degraded to some extent, it may be expected that fuel vapors may migrate to the intake manifold under circumstances where the engine is stopped, which may thus cause a degraded (e.g. misfires, long crank, etc.) engine start event when requested.

If, at 335, it is indicated that the fuel vaporization rate is not greater than the threshold fuel vaporization rate, method 300 may proceed to 340. At 340, method 300 may include shutting down the engine for the idle stop event. In other words, because the fuel vaporization rate is below the threshold fuel vaporization rate, an amount of fuel vapors expected to migrate to the intake manifold may be low enough so as to not result in a degraded engine start event when the next engine start event is requested. Method 300 may then end.

Alternatively, if at 335 it is indicated that the fuel vaporization rate is greater than the threshold fuel vaporization rate, method 300 may proceed to 345. At 345, method 300 may include preventing engine shut down for the idle stop event. Instead, the engine may be maintained combusting air and fuel, and method 300 may proceed to step 225 of method 200. Then, the rest of method 200 may be carried out as discussed in detail above. Briefly, with the engine still combusting air and fuel, the extent of CPV degradation may be retrieved from the controller and, via the lookup table of FIG. 5, the compensated engine idle speed may be determined. In this way, by maintaining the engine combusting and controlling engine idle speed as a function of intake manifold vacuum level and extent of CPV degradation, engine hesitation and/or stall may be avoided, while also avoiding degraded engine start issues which may otherwise result if the engine were stopped at the idle stop event.

Returning to 330, responsive to an indication that the vehicle is not a non-hybrid or light hybrid with stop/start capabilities, method 300 may proceed to 350. At 350, method 300 may include indicating whether the vehicle is a mild hybrid electric vehicle (HEV) or a full HEV. IN other words, at 350, method 300 may include determining whether the vehicle includes a motor capable of rotating the engine unfueled for an extended period of time via power supplied from a traction battery (e.g. 158), for example. If the vehicle is neither a non-hybrid or light hybrid equipped with stop/start capabilities (refer to step 330), nor a mild or full HEV (refer to step 350), method 300 may proceed directly to step 225 of method 200, and from there the rest of method 200 may be carried out as discussed above. Said another way, because the vehicle is not equipped with stop/start capabilities and because there is an indication of CPV degradation, engine idle speed may be increased as per the methodology of FIG. 2 in order to compensate for fuel vapors and/or air that may be drawn into the engine via the degraded CPV while the vehicle is stopped. Returning to 350, in response to an indication that the vehicle is a mild or full HEV, method 300 may proceed to 355. At 355, method 300 may include indicating whether the fuel vaporization rate is greater than the threshold fuel vaporization rate, similar to that already discussed with regard to step 335. If not, method 300 may proceed to 358, where the engine may be shut down and maintained stationary while the vehicle is stopped. In other words, in such a situation, although the CPV is degraded, because the fuel vaporization rate is below the threshold fuel vaporization rate an amount of fuel vapors that may enter the intake manifold via the degraded CPV while the engine is shut down may not be sufficient to result in a degraded engine start event at the next engine start request. Accordingly, in such a situation method 300 may include shutting down the engine at 358. While not explicitly illustrated, it may be understood that the engine may be restarted in response to a request for vehicle acceleration.

Returning to 355, responsive to an indication that the fuel vaporization rate is greater than the threshold fuel vaporization rate, method 300 may proceed to 360. At 360, method 300 may include indicating whether a state of charge (SOC) is greater than an SOC threshold and whether a temperature of the exhaust catalyst, also referred to herein as an emissions control device (e.g. 63), is above a threshold exhaust catalyst temperature. As an example, the threshold exhaust catalyst temperature may comprise a light-off temperature, or in other words, a temperature at which catalytic reactions are effectively initiated via the exhaust catalyst. If both conditions are not met at 360, method 300 may proceed to 365. At 365, method 300 may prevent engine shutdown, and may then proceed to step 225 where the rest of method 200 may be carried out, as discussed above. However, while not explicitly illustrated, it may be understood that in some examples, if the SOC is above the SOC threshold, also referred to as a first SOC threshold, but the exhaust catalyst temperature is not above the threshold exhaust catalyst temperature, there may be an opportunity to use an electric heater (e.g. 119) coupled to the exhaust catalyst if the vehicle is equipped with such an electric heater, to raise the temperature of the exhaust catalyst above the threshold exhaust catalyst temperature. Because raising the temperature of the exhaust catalyst above the threshold exhaust catalyst temperature via the electric heater may utilize battery power, in examples where the electric heater is relied upon, in some examples the electric heater may only be used if the SOC is above a second SOC threshold that is greater than the first SOC threshold. In other words, the electric heater may be used provided that the amount of battery power used to raise the temperature of the exhaust catalyst to the threshold exhaust catalyst temperature is such that, once the exhaust catalyst has reached the threshold exhaust catalyst temperature, the SOC of the onboard energy storage device remains above the first SOC threshold. In such a case, rather than preventing engine shutdown at 365, method 300 may instead proceed to 370.

Thus, if both conditions are met at step 360, either because the SOC is above the first SOC threshold and the exhaust catalyst temperature is above the threshold exhaust catalyst temperature, or because the electric heater was utilized to raise the temperature of the exhaust catalyst to the threshold exhaust catalyst temperature, method 300 may proceed to 370. At 370, method 300 may include stopping providing fueling and spark to the engine. In other words, the engine may be deactivated at step 370.

Continuing to 375, method 300 may include rotating the engine unfueled via the motor (e.g. 152) in the forward, or default direction. It may be understood that the forward, or default direction may comprise the same direction the engine spins when combusting air and fuel. By rotating the engine unfueled, fuel vapors may be drawn from the fuel system and evaporative emissions system through the degraded CPV, and routed to the exhaust catalyst. While not explicitly illustrated, it may be understood that the controller may command a speed at which the engine is rotated as a function of the extent of CPV degradation and fuel vaporization rate. For example, the controller may rely on a lookup table that enables determination of engine speed as the current extent of CPV degradation and the current fuel vaporization rate. In this way, unfueled engine rotation may reduce opportunity for a degraded engine start at the next engine start request, which may otherwise occur if the engine were simply shut down while the vehicle is stopped.

Thus, continuing to 380, method 300 may include indicating whether conditions are met for discontinuing unfueled engine rotation. For example, conditions being met for discontinuing such operation may include a request for vehicle acceleration that involves starting the engine again. In some examples, while the engine is rotating unfueled, a concentration of fuel vapors entering into the engine and/or exiting the engine may be monitored via a hydrocarbon sensor (e.g. 67) and/or an exhaust gas sensor (e.g. 64), respectively. In response to the concentration of fuel vapors dropping below a predetermined threshold fuel vapor concentration, then conditions may be indicated to be met for discontinuing unfueled engine rotation. In such an example, while not explicitly illustrated, it may be understood that fuel vaporization rate may continue to be monitored, and if deemed appropriate (e.g. fuel vaporization rate rises above the threshold), the engine may again be commanded to rotate unfueled to route fuel vapors to the exhaust catalyst. As an example, the hydrocarbon sensor may continue to monitor fuel vapor concentration, and in a situation where the engine was stopped from rotating unfueled, but then fuel vapor concentration rises above another threshold fuel vapor concentration, then the engine may once again be commanded to rotate unfueled. In this way, engine rotation via the motor may be minimized.

If conditions are not met for discontinuing unfueled engine rotation at 380, method 300 may return to 375. Alternatively, in response to conditions being met at 380, method 300 may proceed to 385. At 385, method 300 may include discontinuing unfueled engine rotation. Specifically, the motor may be commanded via the controller to stop rotating the engine unfueled. Proceeding to 390, method 300 may include updating engine operating parameters. For example, in a case where vehicle acceleration was requested, updating engine operating parameters may include controlling actuators (e.g. throttle, fuel injector(s), spark plug(s), etc.) to meet the acceleration request. Method 300 may then end.

Returning to the lookup table of FIG. 5, it may be understood that it may be desirable to periodically populate the table with new values for engine idle speed, due to the fact that over time, an engine stall point may change as a function of aging engine components, degradation, etc. Populating the table with new values may be possible provided that the engine stall point is known, over time. In other words, referring to FIG. 5, while a particular engine idle speed (e.g. 110 RPM) may be sufficient for preventing engine hesitation and/or stall for the engine at a particular intake manifold vacuum (e.g. −12 InHg) where the CPV is degraded to a particular extent (e.g. 0.04"), the same engine idle speed may not be sufficient under the same intake manifold vacuum and extent of CPV degradation as the engine ages and the stall point changes. In such an example, the engine idle speed may need to be increased even further, to avoid engine hesitation and/or stall issues.

Accordingly, turning to FIG. 6, a high-level example method 600 for learning an engine stall point, is depicted. Method 600 will be described with reference to the systems described herein and shown in FIG. 1, though it will be appreciated that similar methods may be applied to other systems without departing from the scope of this disclosure. Instructions for carrying out method 600 may be executed by a controller, such as controller 12 of FIG. 1, based on instructions stored in non-transitory memory, and in conjunction with signals received from sensors of the engine system, such as temperature sensors, pressure sensors, and other sensors described in FIG. 1. The controller may employ actuators such as throttle (e.g. 42), CPV (e.g. 92), CVV (e.g. 87), VBV (e.g. 85), etc., to alter states of devices in the physical world according to the methods depicted below.

Method 600 begins at 605 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 610, method 600 may include indicating whether conditions are met for learning the engine stall point. In one example, conditions being met may include an indication that the vehicle has been driven a predetermined number of miles (e.g. 10,000) since a previous engine stall point learning diagnostic was conducted. Conditions being met at 610 may additionally or alternatively include an indication that the engine is in operation, and that the vehicle is stationary. Conditions being met at 610 may additionally or alternatively include an indication that the vehicle is unoccupied. For example, an engine start may be initiated remotely, and one or more of seat load sensors, door sensors, onboard cameras, etc., may be relied upon for inferring that the vehicle is unoccupied. It is herein recognized that it may be beneficial to conduct the engine stall point learning diagnostic under situations where the vehicle is not occupied, so as to avoid disturbing the vehicle operator and/or passengers. However, in other examples, responsive to conditions being met for conducting the engine stall point learning diagnostic, and under conditions where the vehicle is occupied, an alert may be communicated to the vehicle operator in the form of an audible message, a text-based message displayed at the vehicle dash, a text message sent to the vehicle operator's phone, etc., to notify the vehicle operator of the request to conduct the engine stall point learning diagnostic. In such an example, in order to proceed with the diagnostic, the vehicle operator may have to confirm the request. For example, the vehicle operator may confirm the request via a touch screen associated with the vehicle dash, via a software application on the vehicle operator's phone, audibly, or any other manner in which the vehicle operator may communicate with the controller of the vehicle to confirm the request. Conditions being met at 610 may additionally or alternatively include an indication that other diagnostics are not currently being conducted, which may interfere with the engine stall point learning diagnostic.

If, at 610, it is indicated that conditions are not met for learning the engine stall point, method 600 may proceed to 615, where current operating conditions may be maintained. For example, in a situation where the vehicle surpasses the predetermined number of miles while the vehicle is being propelled via the engine and thus rendering conditions not being met at the current time for conducting the engine stall point learning diagnostic, current engine operating conditions may be maintained at 615. Method 600 may then end.

Returning to 610, in response to conditions being met for learning the engine stall point, method 600 may proceed to 620. At 620, method 600 may include controlling engine speed to a first speed, and monitoring engine idle quality for a predetermined duration (e.g. 5 seconds, 10 seconds, etc.). Monitoring engine idle quality may include monitoring engine RPM for fluctuations indicative of engine hesitation, for example. For example, RPM fluctuations outside of a predetermined RPM range may be indicative of engine hesitation. It may be understood that the first speed may comprise a speed where engine hesitation and/or stall may be expected to not occur.

Continuing to 625, method 600 may include reducing the engine RPM by a predetermined amount (e.g. 10 RPM), and once again monitoring engine idle quality. Reducing engine RPM may include restricting engine air flow via controlling the throttle such that engine RPM drops by the predetermined amount. Continuing to 630, method 600 may include indicating whether an engine stall condition is indicated. For example, as discussed above, if RPM fluctuations are outside of a predetermined RPM range for a given engine speed, then it may be determined that an engine stall condition is indicated. In other words, if the RPM fluctuations are in excess of an expected amount of RPM fluctuation, then the engine stall condition may be indicated. Thus, if at 630 the engine stall condition is not indicated, method 600 may return to 625, where engine RPM may once again be reduced by the predetermined amount and engine idle quality may again be monitored to determine whether the engine stall condition is indicated.

Responsive to the engine stall condition being indicated at 630, method 600 may proceed to 635. At 635, method 600 may include raising engine speed to the first engine speed, to avoid stalling out the engine. In other words, the throttle may be commanded to its original position it was commanded to for controlling engine speed to the first speed. Continuing to 640, method 600 may include storing the results of the engine stall point learning diagnostic at the controller. Proceeding to 645, method 600 may include indicating whether the engine stall point that has been just determined is different than a previously determined engine stall point. If not, method 600 may proceed to 650. At 650, because the engine stall point has not changed, method 600 may include not adjusting the values of FIG. 5 pertaining to engine idle speed. Method 600 may then end.

Alternatively, returning to 645, in response to the current engine stall point differing from the previously determined engine stall point, method 600 may proceed to 655. At 655, method 600 may include adjusting the values of the table of FIG. 5 based on the recently determined engine stall point. For example, the controller may store a model which may receive as input the engine stall point, and which may thus output updated values for engine idle speed as a function of the extent of CPV degradation and intake manifold vacuum level. In this way, the lookup table of FIG. 5 may be periodically updated to account for engine aging, such that the engine idle speeds retrieved from the lookup table may effectively prevent engine hesitation and/or stall issues under conditions of a degraded CPV.

Thus, discussed herein, a method may comprise inferring an engine idle condition, and in response, controlling a speed of an engine to a compensated engine idle speed that is a function of an extent to which a canister purge valve that regulates an amount of fluid flow to the engine from a fuel system and/or an evaporative emissions system, is degraded.

In such a method, the compensated engine idle speed may be greater than a base engine idle speed, where the base engine idle speed is used for the engine idle condition under conditions of an absence of degradation of the canister purge valve.

In such a method, the extent to which the canister purge valve is degraded may be determined based on a rate at which an engine vacuum reduces a pressure in the fuel system and the evaporative emissions system under conditions where the fuel system and the evaporative emissions system are sealed from atmosphere and where the canister purge valve is commanded closed. The extent to which the canister purge valve is degraded may further be a function of a level of a fuel in the fuel system and a rate at which the fuel is vaporizing while the engine vacuum reduces the pressure in the fuel system and the evaporative emissions system.

In such a method, the method may further comprise controlling the speed of the engine to the compensated engine idle speed via electronically controlling a position of a throttle that regulates an amount of intake air flow to the engine.

In such a method, the compensated engine idle speed may be stored at a lookup table as a function of the extent of canister purge valve degradation and further a function of a level of a vacuum in in intake manifold of the engine. The compensated engine idle speed may periodically be adjusted. For example, the method may include periodically learning an engine stall point and wherein periodically adjusting the compensated engine idle speed is based on the engine stall point that is periodically learned.

In such a method, controlling the speed of the engine to the compensated engine idle speed may further comprise preventing the engine from being shut down at the engine idle condition under conditions where it is inferred that shutting down the engine can result in a degraded engine startup at the next engine start request.

In such a method, inferring the engine idle condition may be based on one of a deceleration fuel shut off event ending, an indication provided via an onboard navigation system, and a vehicle deceleration event.

Another example of a method for a hybrid electric vehicle may comprise inferring an idle stop event and under conditions where a canister purge valve that regulates a fluid flow from a fuel system and an evaporative emissions system to an engine is degraded, determining a fuel vaporization rate of a fuel stored in the fuel system in relation to a threshold fuel vaporization rate, and controlling the engine based on the fuel vaporization rate and an extent to which the canister purge valve is degraded.

In such a method, controlling the engine may further comprise commanding the engine to be shut down and maintained stationary at the idle stop event responsive to the fuel vaporization rate being less than the threshold fuel vaporization rate regardless of the extent to which the canister purge valve is degraded.

In such a method, the method may further comprise determining whether a state of charge of an onboard energy storage device is greater than a threshold state of charge and whether a temperature of an exhaust catalyst is greater than a threshold exhaust catalyst temperature in response to an indication that the fuel vaporization rate is greater than the threshold fuel vaporization rate. Controlling the engine may further be a function of whether the state of charge of the onboard energy storage device is greater than the threshold state of charge and whether the temperature of the exhaust catalyst is greater than the threshold exhaust catalyst temperature. Controlling the engine may further comprise stopping the engine from combusting air and fuel and rotating the engine unfueled via a motor during the idle stop event to route fuel vapors to the exhaust catalyst under conditions where the fuel vaporization rate is greater than the threshold fuel vaporization rate, where the state of charge of the onboard energy storage device is greater than the threshold state of charge and where the temperature of the exhaust catalyst is greater than the threshold exhaust catalyst temperature. A speed at which the engine is rotated unfueled may be variable based on the fuel vaporization rate and the extent to which the canister purge valve is degraded. The method may further comprise preventing the engine from being shut down at the idle stop event under conditions where the state of charge of the onboard energy storage device is lower than the threshold state of charge or under conditions where the temperature of the exhaust catalyst is lower than the threshold exhaust catalyst temperature, and where the fuel vaporization rate is greater than the threshold fuel vaporization rate. The method may further comprise controlling the engine to a compensated engine idle speed at the idle stop event, the compensated engine idle speed a function of the extent to which the canister purge valve is degraded, and further a function of a vacuum level in an intake manifold of the engine.

Turning now to FIG. 7, an example timeline 700 is shown, illustrating how an engine idle speed may be controlled as a function of an extent to which the CPV is degraded. Timeline 700 includes plot 705, indicating whether an engine idle condition is indicated, over time. Timeline 700 further includes plot 710, indicating engine speed (e.g. RPM), over time. The engine may be stopped (0), or may be at a speed greater than stopped (+). Timeline 700 further includes plot 715, indicating whether CPV degradation is indicated (yes or no), over time. Timeline 700 further includes plot 720, indicating a position of a throttle (e.g. 42), over time. The throttle may be fully closed, fully open, or somewhere between fully open and fully closed. Timeline 700 further includes plot 725, indicating a status of the CPV (e.g. 92), over time. The CPV may be fully open or fully closed. Timeline 700 further includes plot 730, indicating a status of the VBV (e.g. 85), over time. The VBV may be fully open or fully closed. It may be understood that, due to the notch or orifice associated with the VBV, the VBV may allow the fuel tank to breathe even while the VBV is closed. Timeline 700 further includes plot 735, indicating a status of the CVV (e.g. 87), over time. The CVV may be fully open or fully closed. Timeline 700 further includes plot 740, indicating a fuel vaporization rate, over time. Timeline 700 further includes plot 745, indicating whether the vehicle is a light-hybrid (yes or no), over time. It may be understood that a light hybrid may be configured with stop/start capabilities, but may not include a motor capable of rotating the engine unfueled for an extended period of time. Timeline 700 further includes plot 750, indicating a status of the engine, over time. For this example timeline, the engine may be either off, or may be on and fueled, or in other words, combusting air and fuel, over time.

At time t0, an engine idle conditions is not inferred (plot 705). Accordingly, engine speed (plot 710) is a function of driver demand, and the throttle position (plot 720) corresponds to driver demand. The CPV is degraded (plot 715), and while not explicitly illustrated, it may be understood that the CPV is degraded to a particular extent, as determined via the methodology of FIG. 4. At time t0, the CPV is closed (plot 725), and the VBV is closed (plot 730). Alternatively, the CVV is open (plot 735). Fuel vaporization rate (plot 740) is determined to be above the threshold fuel vaporization rate, represented by line 741. The vehicle is a light-hybrid (plot 745), and the engine is operating to combust air and fuel at time t0 (plot 750).

Between time t0 and t1, an engine idle condition is not inferred, and accordingly, engine speed and throttle position fluctuate as a function of driver demand. At time t1, an engine idle condition is inferred. Because the fuel vaporization rate is greater than the threshold fuel vaporization rate (line 741) and because the vehicle is a light-hybrid, the controller prevents the engine from pulling down, or in other words, being deactivated, at the engine idle condition. Instead the engine is maintained combusting air and fuel at time t1. Responsive to the engine idle conditions being inferred at time t1 and because the CPV is indicated to be degraded, at time t1 the controller queries the lookup table of FIG. 5, and retrieves a compensated engine idle speed as a function of the current extent of CPV degradation and current intake manifold vacuum level. While not explicitly illustrated, as discussed above the controller may infer intake manifold vacuum level based on a pressure difference between the intake manifold pressure sensor (e.g. 198) and atmospheric pressure, monitored for example via the barometric pressure sensor (e.g. 57).

Accordingly, between time t1 and t2, the controller commands the engine speed to the compensated engine idle speed retrieved from the lookup table of FIG. 5 (refer to plot 710). Controlling the engine speed to the compensated engine idle speed involves commanding the throttle to a more open position (refer to plot 720). For reference, dashed line 711 depicts a situation where the CPV is not degraded, and thus, engine speed is not compensated. Correspondingly, dashed line 721 represents a throttle position status under conditions where the CPV is not indicated to be degraded. Thus, it is clear from comparing plot 710 with dashed line 711 that engine idle speed has been controlled to an increased engine idle speed to compensate for the CPV degradation during the engine idle condition. It may be further understood that the increasing of the engine idle speed is controlled via actuating the throttle to a more open position.

At time t2, an engine idle condition is no longer indicated. In this example timeline, it may be understood that the engine idle condition is no longer indicated because the vehicle operator has requested vehicle acceleration. For example, the vehicle operator may request vehicle acceleration via depressing the accelerator pedal of the vehicle. Accordingly, after time t2, engine speed once again is a function of driver demand, controlled at least in part via the throttle.

Turning now to FIG. 8, another example timeline 800 is shown, depicting example methodology for determining an extent of CPV degradation, as discussed above with regard to the method of FIG. 4. Timeline 800 includes plot 805, indicating whether conditions are met for conducting the CPV degradation diagnostic (yes or no), over time. Timeline 800 further includes plot 810, indicating a status of the engine, over time. In this example timeline, the engine may be off (e.g. stationary and not combusting), or may be on and fueled (e.g. combusting air and fuel). Timeline 800 further includes plot 815, indicating a status of the CPV (e.g. 92), plot 820, indicating a status of the VBV (e.g. 85), and plot 825, indicating a status of the CVV (e.g. 87), over time. For each of plots 815, 820 and 825, the respective valves may be either fully open or fully closed, over time. Timeline 800 further includes plot 830, indicating fuel system pressure, over time. In this example timeline it may be understood that fuel system pressure (and evaporative emissions system pressure) may be monitored via the fuel tank pressure transducer (FTPT) (e.g. 23). In this example timeline, pressure in the fuel system is either near atmospheric pressure, or negative (−) with respect to atmospheric pressure. Timeline 800 further includes plot 840, indicating to what extent the CPV is degraded, over time. For simplicity, in this example timeline the CPV may either be not degraded (no), include a 0.04" source of degradation, or include a 0.08" source of degradation.

At time t0, conditions are not yet indicated to be met for conducting the CPV degradation diagnostic (plot 805). The engine is off (plot 810), and the CPV is closed (plot 815) while the CVV is open (plot 825). Furthermore, the VBV is open (plot 820). With the VBV and the CVV open, fuel system (and evaporative emissions system) pressure is near atmospheric pressure.

At time t2, the engine is commanded to combust air and fuel (plot 810). While not explicit illustrated, it may be understood that for this example timeline, the engine activation at time t2 comprises a cold start event. With the engine in operation, at time t2 it is indicated that conditions are met for conducting the CPV diagnostic (plot 805). Accordingly, the CVV is commanded closed (plot 825), the CPV is maintained closed (plot 815), and the VBV is maintained open (plot 820). With the CVV commanded closed, between time t2 and t3 a negative pressure with respect to atmospheric pressure builds as monitored via the FTPT (plot 830), and at time t3, the negative pressure build reaches a negative pressure threshold represented as dashed line 831. The rate at which the negative pressure threshold is reached is then used to determine an extent of CPV degradation, which may involve the controller retrieving the extent of CPV degradation from a lookup table. The lookup table may further include information pertaining to intake manifold vacuum, current rate of fuel vaporization and current fuel level, as discussed above. In other words, while not explicitly illustrated, the rate at which the negative pressure threshold is reached, along with current intake manifold vacuum level, current fuel vaporization rate and fuel level in the fuel tank may all be taken into account when determining the extent of CPV degradation.

In this example timeline, it may be understood that the rate at which the negative pressure threshold was reached (taking into account current fuel vaporization rate, current fuel level, and current intake manifold vacuum level) corresponds to a CPV with a 0.04" source of degradation. For illustrative purposes, plot 832 represents an example where the rate at which the negative pressure threshold was reached is faster than the rate depicted by plot 830. In such an example, the faster rate as illustrated by plot 832 may correspond to a 0.08" source of degradation, depicted by plot 841. As further illustration, plot 833 depicts a situation where fuel system pressure did not decrease with the CVV closed. In such an example, it may be understood that it may be determined that the CPV is not degraded to any appreciable extent.

Accordingly, with CPV degradation determined to be 0.04" at time t3, conditions are no longer indicated to be met for conducting the CPV degradation diagnostic (plot 805). Accordingly, the CVV is commanded open (plot 825), and the VBV is maintained open (plot 820). With the VBV and the CVV both open, pressure in the fuel system and evaporative emissions system rapidly returns to atmospheric pressure (plot 830). At time t4, the VBV is commanded closed, and after time t4 the engine is maintained on combusting air and fuel with the VBV closed, the CPV closed, and the CVV open.

In this way, engine idle speed may be controlled proportionate to a degree or extent to which the CPV is degraded. By controlling engine idle speed in such fashion, fuel economy may be improved as compared to other methodologies which may involve raising engine idle speed to a fixed predetermined speed. Compensating engine idle speed as a function of the extent to which the CPV is degraded may reduce opportunity for engine hesitation and/or stall, which may improve engine lifetime and increase overall customer satisfaction.

The technical effect of raising engine idle speed proportionate to an extent to which the CPV is indicated to be degraded, is that fuel economy may be improved and opportunities for engine hesitation and/or stall reduced or avoided. In another example, the technical effect of learning an engine stall point is to enable periodic updating of a lookup table that stores compensated engine idle speeds as a function of intake manifold vacuum and extent of CPV degradation.

The systems discussed herein and with regard to FIG. 1, along with the method described herein and with regard to FIGS. 2-4 and FIG. 6, may enable one or more systems and one or more methods. In one example, a method comprises inferring an engine idle condition, and in response, controlling a speed of an engine to a compensated engine idle speed that is a function of an extent to which a canister purge valve that regulates an amount of fluid flow to the engine from a fuel system and/or an evaporative emissions system, is degraded. In a first example of the method, the method includes wherein the compensated engine idle speed is greater than a base engine idle speed, where the base engine idle speed is used for the engine idle condition under conditions of an absence of degradation of the canister purge valve. A second example of the method optionally includes the first example, and further includes wherein the extent to which the canister purge valve is degraded is determined based on a rate at which an engine vacuum reduces a pressure in the fuel system and the evaporative emissions system under conditions where the fuel system and the evaporative emissions system are sealed from atmosphere and where the canister purge valve is commanded closed. A third example of the method optionally includes any one or more or each of the first through second examples, and further includes wherein the extent to which the canister purge valve is degraded is further a function of a level of a fuel in the fuel system and a rate at which the fuel is vaporizing while the engine vacuum reduces the pressure in the fuel system and the evaporative emissions system. A fourth example of the method optionally includes any one or more or each of the first through third examples, and further comprises controlling the speed of the engine to the compensated engine idle speed via electronically controlling a position of a throttle that regulates an amount of intake air flow to the engine. A fifth example of the method optionally includes any one or more or each of the first through fourth examples, and further includes wherein the compensated engine idle speed is stored at a lookup table as a function of the extent of canister purge valve degradation and further a function of a level of a vacuum in in intake manifold of the engine; and wherein the compensated engine idle speed is periodically adjusted. A sixth example of the method optionally includes any one or more or each of the first through fifth examples, and further comprises periodically learning an engine stall point and wherein periodically adjusting the compensated engine idle speed is based on the engine stall point that is periodically learned. A seventh example of the method optionally includes any one or more or each of the first through sixth examples, and further includes wherein controlling the speed of the engine to the compensated engine idle speed further comprises preventing the engine from being shut down at the engine idle condition under conditions where it is inferred that shutting down the engine can result in a degraded engine startup at the next engine start request. An eighth example of the method optionally includes any one or more or each of the first through seventh examples, and further includes wherein inferring the engine idle condition is based on one of a deceleration fuel shut off event ending, an indication provided via an onboard navigation system, and a vehicle deceleration event.

Another example of a method for a hybrid electric vehicle comprises inferring an idle stop event and under conditions where a canister purge valve that regulates a fluid flow from a fuel system and an evaporative emissions system to an engine is degraded, determining a fuel vaporization rate of a fuel stored in the fuel system in relation to a threshold fuel vaporization rate; and controlling the engine based on the fuel vaporization rate and an extent to which the canister purge valve is degraded. In a first example of the method, the method further includes wherein controlling the engine further comprises commanding the engine to be shut down and maintained stationary at the idle stop event responsive to the fuel vaporization rate being less than the threshold fuel vaporization rate regardless of the extent to which the canister purge valve is degraded. A second example of the method optionally includes the first example, and further comprises determining whether a state of charge of an onboard energy storage device is greater than a threshold state of charge and whether a temperature of an exhaust catalyst is greater than a threshold exhaust catalyst temperature in response to an indication that the fuel vaporization rate is greater than the threshold fuel vaporization rate; and wherein controlling the engine is further a function of whether the state of charge of the onboard energy storage device is greater than the threshold state of charge and whether the temperature of the exhaust catalyst is greater than the threshold exhaust catalyst temperature. A third example of the method optionally includes any one or more or each of the first through second examples, and further includes wherein controlling the engine further comprises stopping the engine from combusting air and fuel and rotating the engine unfueled via a motor during the idle stop event to route fuel vapors to the exhaust catalyst under conditions where the fuel vaporization rate is greater than the threshold fuel vaporization rate, where the state of charge of the onboard energy storage device is greater than the threshold state of charge and where the temperature of the exhaust catalyst is greater than the threshold exhaust catalyst temperature. A fourth example of the method optionally includes any one or more or each of the first through third examples, and further includes wherein a speed at which the engine is rotated unfueled is variable based on the fuel vaporization rate and the extent to which the canister purge valve is degraded. A fifth example of the method optionally includes any one or more or each of the first through fourth examples, and further comprises preventing the engine from being shut down at the idle stop event under conditions where the state of charge of the onboard energy storage device is lower than the threshold state of charge or under conditions where the temperature of the exhaust catalyst is lower than the threshold exhaust catalyst temperature, and where the fuel vaporization rate is greater than the threshold fuel vaporization rate. A sixth example of the method optionally includes any one or more or each of the first through fifth examples, and further comprises controlling the engine to a compensated engine idle speed at the idle stop event, the compensated engine idle speed a function of the extent to which the canister purge valve is degraded, and further a function of a vacuum level in an intake manifold of the engine.

An example of a system for a vehicle comprises a canister purge valve that controls an amount of air and fuel vapor routed to an engine from a fuel system and an evaporative emissions system; and a controller with computer readable instructions stored on non-transitory memory that when executed cause the controller to: responsive to an indication that the canister purge valve is degraded and further in response to an engine idle condition being inferred, controlling an engine speed to a compensated engine idle speed as a function of an extent to which the canister purge valve is degraded and a vacuum level in an intake manifold of the engine. A first example of the system further comprises a throttle that regulates intake air flow to the engine, where the throttle is electronically actuatable; and wherein the controller stores further instructions to control the throttle in order to control the engine speed to the compensated engine idle speed. A second example of the system optionally includes the first example, and further comprises a canister vent valve positioned in a vent line stemming from a fuel vapor storage canister included in the evaporative emissions system, a vapor bypass valve positioned in a conduit that couples the fuel system to the evaporative emissions system, and a fuel tank pressure transducer; and wherein the controller stores further instructions to, with the engine combusting air and fuel, command closed the canister purge valve and the canister vent valve and command open the vapor bypass valve; monitor a rate at which a negative pressure threshold is reached, the monitoring via the fuel tank pressure transducer, and indicate the extent to which the canister purge valve is degraded based on the rate at which the negative pressure threshold is reached. A third example of the system optionally includes any one or more or each of the first through second examples, and further comprises a lookup table stored at the controller that returns the compensated engine idle speed based on the extent to which the canister purge valve is degraded and the vacuum level in the intake manifold of the engine; and wherein the controller stores further instructions to update the compensated engine idle speed based on a learned engine stall point, the learned engine stall point determined after the vehicle has been driven a predetermined number of miles since a prior learned engine stall point was determined.

In another representation, a method comprises determining an extent to which a canister purge valve that regulates a fluid flow from a fuel system and an evaporative emissions system to an engine is degraded, updating a plurality of engine idle speeds stored at a lookup table based on the extent to which the canister purge valve is degraded, and further updating the plurality of engine idle speeds based on a learned engine stall point.

In still another representation, a method comprises controlling an engine idle speed to a compensated engine idle speed that is proportionate to a degree or extent to which a canister purge valve that regulates a fluid flow from a fuel system and/or evaporative emissions system, is degraded.

In yet another representation, a method comprises controlling a usage of fuel for regulating an engine idle speed to be proportionate to a degree or extent to which a canister purge valve is degraded.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:

inferring an engine idle condition, and in response, controlling a speed of an engine to a compensated engine idle speed that is a function of an extent to which a canister purge valve that regulates an amount of fluid flow to the engine from a fuel system and/or an evaporative emissions system, is degraded.

2. The method of claim 1, wherein the compensated engine idle speed is greater than a base engine idle speed, where the base engine idle speed is used for the engine idle condition under conditions of an absence of degradation of the canister purge valve.

3. The method of claim 1, wherein the extent to which the canister purge valve is degraded is determined based on a rate at which an engine vacuum reduces a pressure in the fuel system and the evaporative emissions system under conditions where the fuel system and the evaporative emissions system are sealed from atmosphere and where the canister purge valve is commanded closed.

4. The method of claim 3, wherein the extent to which the canister purge valve is degraded is further a function of a level of a fuel in the fuel system and a rate at which the fuel is vaporizing while the engine vacuum reduces the pressure in the fuel system and the evaporative emissions system.

5. The method of claim 1, further comprising controlling the speed of the engine to the compensated engine idle speed via electronically controlling a position of a throttle that regulates an amount of intake air flow to the engine.

6. The method of claim 1, wherein the compensated engine idle speed is stored at a lookup table as a function of the extent of canister purge valve degradation and further a function of a level of a vacuum in in intake manifold of the engine; and wherein the compensated engine idle speed is periodically adjusted.

7. The method of claim 6, further comprising periodically learning an engine stall point and wherein periodically adjusting the compensated engine idle speed is based on the engine stall point that is periodically learned.

8. The method of claim 1, wherein controlling the speed of the engine to the compensated engine idle speed further comprises preventing the engine from being shut down at the engine idle condition under conditions where it is inferred that shutting down the engine can result in a degraded engine startup at the next engine start request.

9. The method of claim 1, wherein inferring the engine idle condition is based on one of a deceleration fuel shut off event ending, an indication provided via an onboard navigation system, and a vehicle deceleration event.

10. A method for a hybrid electric vehicle comprising:
inferring an idle stop event and under conditions where a canister purge valve that regulates a fluid flow from a fuel system and an evaporative emissions system to an engine is degraded, determining a fuel vaporization rate of a fuel stored in the fuel system in relation to a threshold fuel vaporization rate; and
controlling the engine based on the fuel vaporization rate and an extent to which the canister purge valve is degraded.

11. The method of claim 10, wherein controlling the engine further comprises commanding the engine to be shut down and maintained stationary at the idle stop event responsive to the fuel vaporization rate being less than the threshold fuel vaporization rate regardless of the extent to which the canister purge valve is degraded.

12. The method of claim 10, further comprising determining whether a state of charge of an onboard energy storage device is greater than a threshold state of charge and whether a temperature of an exhaust catalyst is greater than a threshold exhaust catalyst temperature in response to an indication that the fuel vaporization rate is greater than the threshold fuel vaporization rate; and
wherein controlling the engine is further a function of whether the state of charge of the onboard energy storage device is greater than the threshold state of charge and whether the temperature of the exhaust catalyst is greater than the threshold exhaust catalyst temperature.

13. The method of claim 12, wherein controlling the engine further comprises stopping the engine from combusting air and fuel and rotating the engine unfueled via a motor during the idle stop event to route fuel vapors to the exhaust catalyst under conditions where the fuel vaporization rate is greater than the threshold fuel vaporization rate, where the state of charge of the onboard energy storage device is greater than the threshold state of charge and where the temperature of the exhaust catalyst is greater than the threshold exhaust catalyst temperature.

14. The method of claim 13, wherein a speed at which the engine is rotated unfueled is variable based on the fuel vaporization rate and the extent to which the canister purge valve is degraded.

15. The method of claim 12, further comprising preventing the engine from being shut down at the idle stop event under conditions where the state of charge of the onboard energy storage device is lower than the threshold state of charge or under conditions where the temperature of the exhaust catalyst is lower than the threshold exhaust catalyst temperature, and where the fuel vaporization rate is greater than the threshold fuel vaporization rate.

16. The method of claim 15, further comprising controlling the engine to a compensated engine idle speed at the idle stop event, the compensated engine idle speed a function of the extent to which the canister purge valve is degraded, and further a function of a vacuum level in an intake manifold of the engine.

17. A system for a vehicle, comprising:
a canister purge valve that controls an amount of air and fuel vapor routed to an engine from a fuel system and an evaporative emissions system; and
a controller with computer readable instructions stored on non-transitory memory that when executed cause the controller to:
responsive to an indication that the canister purge valve is degraded and further in response to an engine idle condition being inferred, controlling an engine speed to a compensated engine idle speed as a function of an extent to which the canister purge valve is degraded and a vacuum level in an intake manifold of the engine.

18. The system of claim 17, further comprising a throttle that regulates intake air flow to the engine, where the throttle is electronically actuatable; and
wherein the controller stores further instructions to control the throttle in order to control the engine speed to the compensated engine idle speed.

19. The system of claim 17, further comprising a canister vent valve positioned in a vent line stemming from a fuel vapor storage canister included in the evaporative emissions system, a vapor bypass valve positioned in a conduit that couples the fuel system to the evaporative emissions system, and a fuel tank pressure transducer; and
wherein the controller stores further instructions to, with the engine combusting air and fuel, command closed the canister purge valve and the canister vent valve and command open the vapor bypass valve;
monitor a rate at which a negative pressure threshold is reached, the monitoring via the fuel tank pressure transducer, and indicate the extent to which the canister purge valve is degraded based on the rate at which the negative pressure threshold is reached.

20. The system of claim 17, further comprising a lookup table stored at the controller that returns the compensated engine idle speed based on the extent to which the canister purge valve is degraded and the vacuum level in the intake manifold of the engine; and
wherein the controller stores further instructions to update the compensated engine idle speed based on a learned engine stall point, the learned engine stall point determined after the vehicle has been driven a predetermined number of miles since a prior learned engine stall point was determined.

* * * * *